US012648563B2

(12) United States Patent
Martelletti

(10) Patent No.: US 12,648,563 B2
(45) Date of Patent: Jun. 9, 2026

(54) SURFACTANT COMBINATION FOR AQUEOUS AGROCHEMICAL (CROP PROTECTION) SUSPENSION FORMULATIONS WITH HIGH SALT CONTENT AND LOW-CONCENTRATION OF SULFONYLUREA HERBICIDE

(71) Applicant: Bayer Aktiengesellschaft, Leverkusen (DE)

(72) Inventor: Arianna Martelletti, Leverkusen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 214 days.

(21) Appl. No.: 18/707,229

(22) PCT Filed: Nov. 9, 2022

(86) PCT No.: PCT/EP2022/081341

§ 371 (c)(1),
(2) Date: May 3, 2024

(87) PCT Pub. No.: WO2023/083897

PCT Pub. Date: May 19, 2023

(65) Prior Publication Data

US 2025/0017212 A1 Jan. 16, 2025

(30) Foreign Application Priority Data

Nov. 11, 2021 (EP) .................................... 21207839

(51) Int. Cl.

| | |
|---|---|
| ***A01N 47/38*** | (2006.01) |
| ***A01N 25/04*** | (2006.01) |
| ***A01N 41/10*** | (2006.01) |
| ***A01N 57/12*** | (2006.01) |
| ***A01P 13/02*** | (2006.01) |

(52) U.S. Cl.

CPC ............. *A01N 47/38* (2013.01); *A01N 25/04* (2013.01); *A01N 41/10* (2013.01); *A01N 57/12* (2013.01); *A01P 13/02* (2021.08)

(58) Field of Classification Search

CPC ........ A01N 47/38; A01N 25/04; A01N 41/10; A01N 57/12; A01P 13/02

See application file for complete search history.

(56) References Cited

U.S. PATENT DOCUMENTS

| | | | |
|---|---|---|---|
| 6,251,827 | B1 | 6/2001 | Ziemer et al. |
| 6,376,429 | B1 | 4/2002 | Van Almsick et al. |
| 8,053,393 | B2 | 11/2011 | Patel et al. |
| 2007/0111890 | A1 | 5/2007 | Patel et al. |

FOREIGN PATENT DOCUMENTS

| | | | |
|---|---|---|---|
| CN | 107646861 | A | 2/2018 |
| CN | 109380391 | A | 2/2019 |
| DE | 102006030326 | A1 | 1/2008 |
| EP | 0915652 | A1 | 5/1999 |
| EP | 1392117 | B1 | 6/2005 |
| EP | 2005824 | A1 | 12/2008 |
| WO | 0105788 | A1 | 1/2001 |
| WO | 03026427 | A1 | 4/2003 |
| WO | 2005087004 | A2 | 9/2005 |
| WO | 2008135854 | A2 | 11/2008 |
| WO | 2008155026 | A2 | 12/2008 |
| WO | 2020025652 | A2 | 2/2020 |

OTHER PUBLICATIONS

International Preliminary Report on Patentability from PCT Application No. PCT/EP2022/081341, mailed May 2, 2024.

*Primary Examiner* — Trevor Love
(74) *Attorney, Agent, or Firm* — Michael Vanengelen

(57) ABSTRACT

The present invention relates to aqueous dispersions comprising an ALS inhibitor, typically a sulfonylurea herbicide, specifically from the class of triazolinones herbicides, a HPPD inhibitor, specifically a triketone as from the class of 2-benzoyl-1,3-cyclohexanedione herbicides, optionally a safener from the class of the sulfonamides, a water-soluble herbicide present as a salt, specifically glyphosate and to dispersions resulting from dispersing the concentrate suspension in water, to a method of making the aqueous suspension and to a method of controlling unwanted plants using these dispersions.

19 Claims, No Drawings

SURFACTANT COMBINATION FOR AQUEOUS AGROCHEMICAL (CROP PROTECTION) SUSPENSION FORMULATIONS WITH HIGH SALT CONTENT AND LOW-CONCENTRATION OF SULFONYLUREA HERBICIDE

The present application is a 35 U.S.C. § 371 national phase entry of International Application No. PCT/EP2022/081341, filed on Nov. 9, 2022, which claims priority to European Patent Application No. 21207839.8, filed Nov. 11, 2021, the contents of each of which are hereby incorporated by reference in their entirety.

The present invention relates to aqueous dispersions comprising an ALS inhibitor (acetolactate synthase inhibitor), typically a sulfonylurea herbicide, specifically from the class of triazolinones herbicides, a HPPD inhibitor (4-Hydroxyphenylpyruvate dioxygenase inhibitor), specifically a triketone as from the class of 2-benzoyl-1,3-cyclohexanedione herbicides, optionally a safener from the class of the sulfonamides, and a water-soluble herbicide present as a salt, preferably glyphosate, and to dispersions resulting from dispersing the concentrated suspension in water, and to a method of making the aqueous suspension and to a method of controlling unwanted plants using said dispersions.

Herbicidal crop protection agents (herbicides) and combinations/compositions thereof known to date for controlling harmful plants or unwanted vegetation often have some disadvantages, above all (a) that they have no or else insufficient herbicidal activity against specific harmful plants, (b) that the spectrum of harmful plants which can be controlled with the herbicides is not broad enough, (c) that the selectivity of herbicides in and the compatibility with crops is too low, thereby causing unwanted damage and/or unwanted reduced harvest yields of the crops, (d) that the initial herbicidal activity is not acceptable or not strong enough and/or (e) that the herbicidal activity does not last long enough. For this reason, there is a constant need to develop novel herbicidal combinations/compositions which have advantages over the known ones at least in some areas while maintaining advantageous properties.

Herbicidally active compounds are generally not employed in their pure form. Depending on the area of use and the type of application, and on physical, chemical and biological parameters, the active compounds are employed as an active compound formulation in a mixture with customary auxiliaries and additives. Many herbicides display unwanted phytotoxic properties against useful plants.

To increase the herbicidal activity against a large number of unwanted plants, the combined application of at least two, more preferably three herbicidally active compounds may be expedient. In some cases, this results in synergistic effects.

To avoid unwanted phytotoxic side-effects, it is known to apply herbicides in combination with a safener. Safeners are compounds which, fully or predominantly, prevent the phytotoxic side-effects of herbicides in useful plants.

For practical reasons, it is desirable for the end user to have a single composition to apply to its crop.

However, combining different actives in the same agrochemical composition can be challenging, in particular when the herbicides to be combined have different physical and chemical characteristics. The choice of the adjuvants, carriers and surfactants that allow combining actives from different families into a single stable agrochemical composition can be the object of a long and extensive research.

Hence, crop protectant compositions can be formulated in many different ways, with the possibility of the characteristics of the active ingredients and the nature of the formulation may give problems in terms of stability, efficacy, and applicability of the formulations. Moreover, certain formulations are more advantageous on economic and environmental grounds than others.

Suspension concentrates or water-dispersible granules are already known as formulations of these active substances, see, for example, "The Pesticide Manual" 13th edition (2003), The British Crop Protection Council. EP 1 392 117 B1 discloses formulations of various hydroxyphenylpyruvate dioxygenase inhibitors in combination with certain fertilizers. WO 08/135854-A2 discloses oil dispersions of 2-benzoyl-1,3-cyclohexanediones.

Active substances are known to the skilled worker for example from "The Pesticide Manual" 14th Ed., British Crop Protection Council 2006, and the website "http://www.alanwood.net/pesticides/"

In general, formulations of herbicidal active substances should have high chemical and physical stability, good application properties and user friendliness and a broad biological activity combined with high selectivity.

Depending on the intended use, the user demands formulations which are simple to handle and storage stable. However, the formulations known from the prior art are not always satisfactory for these purposes.

Water-based formulations generally have the advantage that they require a low fraction of organic solvents, or none at all. On the other hand, the distribution of the constituents in such formulations is often inadequate unless appropriate combinations of auxiliaries are used. The performance properties of such formulations frequently depend on a large number of variable parameters, making it impossible simply to select components of known systems and to combine them with the active ingredients intended for new formulation, if the resultant formulation is to be biologically active, stable on storage, and ideal from the applications standpoint.

Standard formulations, therefore, are rarely suitable for meeting particular requirements, and it is necessary involve a great deal of experimental work to develop an appropriate formulation.

Agrochemical formulations comprising a solid active ingredient suspended in water are well known. Such formulations are referred to as suspension concentrates (GIF AP code: "SC"). The SC is a concentrate which is diluted with water before use to produce an aqueous composition which is used in controlling plants or plant growth. Dilution in water results in a suspension if the active ingredient is insoluble in water and if the active ingredient is soluble in water (in concentrations present in the resulting spraying broth) an emulsion is formed (as is the case with tembotrione and thiencarbazone-methyl).

To facilitate dispersion in water such formulations usually contain emulsifiers, dispersants and further formulation components such as thickeners, antifoams and solid carriers. Suspension concentrates are often chosen as preferred formulations if the active ingredient is insensitive and insoluble in water. However, suspension concentrates are usually not suitable for hydrolysis sensitive active ingredients such as ALS-Inhibitors, which are usually formulated as an oil dispersions (preferably free of water to prevent degradation of any sensitive active ingredient) or incorporated into solid formulations.

Moreover a loading/concentration of <60 g/L active ingredient generally does not lead to an acceptable chemical stability of the ALS-inhibitor in water, since hydrolysis decreases the concentration of the ALS-inhibitor to a level at which herbicidal efficacy is no longer sufficient. If this is the case, unwanted resistances may occur.

Hence, one solution to overcome this problem presented in the state of art is to use other carriers than water, e.g. glycerine.

Various formulations for water soluble active ingredients are known, in particular for herbicides like glufosinate and glyphosate. However, if one or more active ingredient in dispersion (SC formulation) is present, especially a low amount of a hydrolysis unstable sulfonylurea (ALS-inhibitor) herbicide, sufficient chemical stability of the formulation is not obtained.

Thus, WO 03/026427 discloses inter alia the mixtures of the herbicidally active compounds of the formula (I), (I)

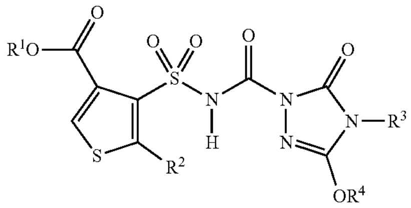

in which the radicals $R^1$ to $R^4$ are essentially alkyl, and safeners of the formula (III)

(III)

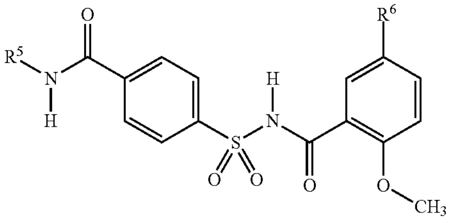

in which $R^5$ is essentially alkyl or cycloalkyl and $R^6$ is essentially hydrogen, alkyl or halogen.

Herbicidally active compounds of the formula (I) are known, for example, from WO 01/05788. Safeners of the formula (III) are known, for example, from U.S. Pat. No. 6,251,827. Herbicidally active compounds of the formula (II) are known, for example, from U.S. Pat. No. 6,376,429.

Herbicidal compositions comprising ALS-inhibiting herbicides and HPPD-inhibiting herbicides are known in the art. For example, EP-A-0915652 discloses, inter alia, mixtures of various sulfonylurea herbicides with 2-[4-methylsulfonyl]-2-nitrobenzoyl]-1,3-cyclohexanedione. WO 20/025652A1 describes the use of a preferred thickener combination for agrochemical formulations with high salt content and a non-water-soluble herbicide in suspension, particularly with the herbicides glyphosate-IPA and indaziflam or glufosinate-ammonium and Indaziflam.

The combination of thiencarbazone-methyl with cyprosulfamide and tembotrione, i.e. the compound of the formula (II) in which $R^8$ is chloro and $(R^2)_a$ is 4-(methylsuphonyl)-3-(2,2,2-trifluoroethoxy)methyl are known from WO 05/087004A2.

DE 10 2006 030 326 A1 describes an active combination of a sulfonylurea, an HPPD inhibitor and a safener as a synergistic herbicidal combination.

EP 2 005 824 A1 (same as WO 08/155026 A2) describes suspension of herbicide active ingredients in glycerine. This carrier is used to stabilize sulfonylurea (ALS Inhibitor) that are highly sensitive to hydrolysis, especially when used concentrations are below 6 wt %. Preferably, WO 08/155026 A2 describes suspensions containing inter alia 0.1-2 wt % of a sulfonylurea herbicide, particularly thiencarbazone-methyl, with an HPPD inhibitor and a safener and a minimum of 60 wt % of glycerine as the carrier.

U.S. Pat. No. 8,053,393 B2 describes an aqueous herbicidal composition based on a suspension concentrate comprising herbicides and safeners, more specifically an active combination of a sulfonylurea, an HPPD inhibitor and a safener as a synergistic herbicidal combination, where an alkyl polyglycoside (AL 2575 from Uniquema) and an alkyl ether phosphate (Dispersogen® LFH from Clariant) represent the stabilizing surfactant combination. Particularly the triazolinone herbicide is present from 4 to 30 wt %, which is a concentration in an aqueous suspension higher as the one used in the present invention, thus not creating particular chemical stability (hydrolytically sensitive herbicide) problems.

Since its introduction, thiencarbazone-methyl has typically been formulated in herbicide products as solid compositions, such as granules, particularly water-dispersible or water-soluble granules, water-based and non-water-based suspensions. Not only can granules be readily dispensed, but thiencarbazone-methyl generally has excellent storage stability in solid compositions. Within water-based suspensions, stability is given down to 6% active. For lower concentrations of active, lower than 2 wt %, a non-aqueous carrier as glycerine is needed to reach an acceptable chemical stability.

The aforementioned formulations are suitable for thiencarbazone-methyl in combination with other high-melting active ingredients but also including active ingredients that are water-soluble salts in a suspension concentrate can be difficult. Although low-loaded suspensions concentrate of thiencarbazone-methyl in non-aqueous media are known, the scale-up and industrialization of such formulations remains a technical challenge due to high viscosity. Thus, it would be preferable to use water as a suspending medium, but one has to face then the challenge of the ready hydrolysis of the herbicide when loaded below 2 wt %.

Thus, from a manufacturing standpoint, there is a need to solve this challenge.

Further, it was the objective of the present invention, to propose a stable composition combining the two following families of herbicidal actives: A water soluble herbicide, e.g. glyphosate, glufosinate or dicamba, preferably as potassium salt, and as a second family the sulfonylureas (ALS inhibitors) and triketones (HPPD inhibitors).

Preferably the formulation relates to a mixture comprising thiencarbazone-methyl, tembotrione, glyphosate-K (glyphosate potassium salt) and cyprosulfamide.

It has been discovered that those actives are increasing their activity against unwanted vegetation when used together, but also that it was difficult to formulate them in a single stable formulation without observing physical stability issues and especially chemical degradation of the non water-soluble actives in a high salt content environment (e.g. due to glyphosate-potassium), in particular when used at loadings as low as 3 wt % each of the ALS and HPPD inhibitors. As a result of the rapid chemical degradation these combinations loose efficacy and, hence, are not suitable for agrochemical use anymore.

Concentrated liquid compositions can readily include not only active ingredients that are water-soluble salts but also high-melting active ingredients such as sulfonylurea herbicides, which generally are present in the form of solid particles dispersed in a liquid carrier. Such liquid concentrate formulations can be easily measured and poured, and when diluted with water typically give easily sprayed aqueous solutions, emulsions or dispersions.

However, as said above, compared to solid formulations, liquid formulations of sulfonylureas are more prone to certain problems. When dissolved or dispersed in a liquid carrier, even a carrier comprising a nonaqueous solvent, sulfonylurea herbicides may be susceptible to decomposition. Also, crystal growth can occur during storage of concentrated liquid formulations in which active ingredients are dissolved or dispersed, and suspended active ingredients are prone to settling out, so that obtaining stable liquid formulations is challenging.

Because of its high herbicidal activity, thiencarbazone-methyl is typically applied at very low rates, e.g., <10 g/ha. Accordingly, when combined with much higher use rate herbicides in a concentrated formulated composition, thiencarbazone-methyl must be in low concentration to accommodate a sufficiently high concentration of higher use rate herbicides in the composition, such as water-soluble salt herbicides. However, it has now been found that although thiencarbazone-methyl is sufficiently stable at high concentration in water as carrier in the presence of one or more surfactants having an emulsifier property, at concentrations of 1 wt % or less, unfortunately thiencarbazone-methyl is susceptible to decomposition (chemical degradation) during storage of the composition to a commercially undesirable extent (loss of biological efficacy), even more in the presence of a water-soluble salt herbicide.

Remarkably, as described herein, a surprising means of stabilization of low concentrations of thiencarbazone-methyl in such a liquid composition has now been discovered, thus providing a new stabilized liquid composition for dilution with water and application to undesirable vegetation to be controlled.

The present invention relates to the field of crop protection formulations. In particular, the invention relates to formulations in the form of aqueous suspension concentrates comprising herbicidal compositions comprising at least one herbicidally active compound from the group of the inhibitors of acetolactate synthetase (ALS) (A), especially triazolinones, a herbicidally active compound from the group of the inhibitors of hydroxyphenylpyruvate dioxygenase (HPPD) (B), especially triketones, a water soluble herbicide, preferably glyphosate as the potassium salt, (C) and at least one safener (D) from the group of the acylsulfonamides. Preferably the formulation relates to an aqueous dispersion comprising thiencarbazone-methyl, tembotrione, glyphosate-K (potassium salt) and cyprosulfamide.

Surprisingly, it has now been found that certain herbicide combinations or compositions comprising said herbicide combinations exhibit the desired herbicidal activity and are able to control harmful plants or unwanted vegetation in a more efficacious manner while providing and maintaining other desired properties as well.

This invention provides a stable liquid herbicide composition comprising thiencarbazone-methyl not exceeding 0.2 wt % by weight of the composition, which accommodates higher concentrations of other active herbicides in the composition.

It was also surprisingly found that stable aqueous dispersions of a 2-benzoyl-1,3-cyclohexanedione and an ALS inhibitor, preferably a triazolinone herbicide, used in a concentration in the composition of less than 0.2 wt % (percent by weight) (but more than 0.01 wt %) based on the total weight of the composition, in the presence of a water-soluble herbicide, can be obtained by the use of a specific, inventive surfactant combination in the dispersion.

Moreover, despite the low amounts of the ALS-inhibitor, preferably a sulfonyl-urea herbicide, more preferred thiencarbazone-methyl, the compositions still exhibit good biological/herbicidal efficacy.

The aqueous suspension concentrates according to the invention have high chemical and physical storage stability and, in a concentrated form and on dilution with water, a homogeneous distribution of the active compounds, and do not tend to block spray nozzles.

Further, if not otherwise indicated in the present invention % shall refer to wt % based on the total composition.

Thus, the present invention discloses the mixtures of the herbicidally active compounds of the formula (I) [component A)] (ALS-inhibitor, (I)

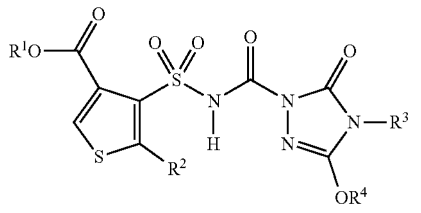

in which the radicals $R^1$ to $R^4$ are essentially alkyl, preferably $C_1$-$C_4$ alkyl, and more preferred $R^1$, $R^2$, $R^3$ and $R^4$ independently of one another are methyl or ethyl.

When $R^1$, $R^2$, $R^3$ and $R^4$ are methyl, the compound is thiencarbazone-methyl, which is most preferred Triazolinone herbicides (ALS-inhibitors), specifically thiencarbazone-methyl, are well known for their excellent weed controlling properties. Several formulations are known and used with good effect.

Herbicidally active compounds of the HPPD Inhibitors class, specifically triketones, are shown in formula (II) [component B)]:

In a preferred embodiment the triketone is a 2-benzoyl-1,3-cyclohexanedione of formula (II), (II)

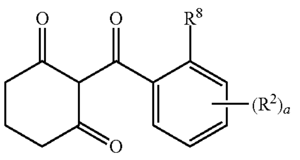

Wherein the substituents have the same meaning as given below in the specification. $R^8$ is selected from the group consisting of halogen, $NO_2$ (nitro group), $C_{1-4}$ alkyl, $C_{1-4}$ haloalkyl, $C_{1-6}$ alkoxy, $C_{1-6}$ alkoxy-$C_{1-6}$ alkyl, $C_{1-6}$ alkoxy-$C_{2-6}$ alkoxy, $C_{1-6}$ alkoxy-$C_{2-6}$-alkoxy-$C_{1-6}$alkyl, $C_{1-4}$ haloalkoxy and $C_{1-4}$ haloalkoxy-$C_{1-4}$alkyl.

Preferably, $R^8$ is chloro, methylsulfonyl or trifluoromethyl group.

With regards to compounds of formula (II) $(R^2)_a$ is preferably selected from the group consisting of hydrogen, methylsulfonyl, trifluoromethyl and 2,2,2-trifluoroethoxymethyl or a combination thereof.

Most preferred is $R^8$ is chloro and $(R^2)_a$ is 4-(methylsuphonyl)-3-(2,2,2-trifluoroethoxy)methyl (tembotrione).

2-benzoyl-1,3-cyclohexanedione herbicides are well known for their excellent weed controlling properties. Several formulations of 2-benzoyl-1,3-cyclohexanedione herbicides are known and used with good effect.

Water Soluble Herbicide [Component C)]:

A water soluble herbicide can be selected for example from the group of glyphosate, glufosinate or dicamba, preferably as potassium salt.

Preferably the water-soluble herbicide is a glyphosate salt, most preferably the potassium salt. Glyphosate is used as a potassium salt technical stock solution with a concentration of 47.3 wt %.

Preferably the amount of technical solution in the composition is from 50 to 70 wt %, more preferred from 55 to 65 wt % and most preferred from 59 to 62 wt %.

Safeners [Component D)]

Preferred safeners are selected from the sulfonamide class, in particular said safeners are those according to formula (III):

(III)

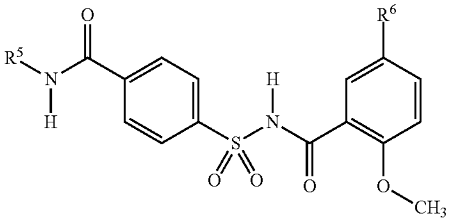

in which $R^5$ is alkyl or cycloalkyl, preferably the alkyl is $C_1$-$C_4$ alkyl, more preferred methyl, ethyl, propyl, isopropyl, butyl, t-butyl, and isobutyl and the cycloalkyl is cyclopropyl, cyclobutyl, cyclopentyl or cyclohexyl.

Most preferred $R^5$ is cyclopropyl.

The $R^6$ substituent is selected from hydrogen, alkyl, wherein preferably the alkyl is $C_1$-$C_4$ alkyl, more preferred methyl, ethyl, propyl, isopropyl, butyl, t-butyl, and isobutyl, or halogen (halogen substituents are fluoro, chloro, bromo and iodo).

Most preferred $R^5$ is cyclopropyl and $R^6$ is hydrogen (cyprosulfamide).

Surfactant System [Component E)]

E) are dispersants comprising at least an alkyl ether phosphate surfactant component E1) and at least one alkyl polyglycoside surfactant component E2), and F) to H) optionally further non-active ingredients like additives customary in crop protection and formulation auxiliaries.

In one preferred embodiment, the components F) to H) are mandatory.

As component I) water or in an alternative embodiment glycerine is present.

The invention relates also to the technical field of surfactant combinations for crop protection formulations with high salt content, in particular herbicidal formulations, and formulations containing said adjuvant combinations, as well as methods for producing said formulations. In a preferred embodiment, the instant invention relates to aqueous formulations of water-soluble active ingredients, in particular aqueous formulations of salt-like active ingredients, and especially to formulations containing glyphosate, in combination with at least one further sulfonylurea active ingredient (ALS-inhibitor), especially from the triazolinone family, and at least one further HPPD active ingredient, and at least a safener, which are suspended in the formulation, wherein the formulations contain a high salt content, specifically glyphosate-potassium.

The compounds of formula (I)-(III) according to the invention can be used as herbicides by themselves, but they are generally formulated into herbicidal compositions using formulation adjuvants, such as carriers, solvents and surface-active agents (SFAs). Thus, the present invention further provides a herbicidal composition comprising a herbicidal compound of the present invention and an agriculturally acceptable formulation adjuvant. The composition can be in the form of concentrates which are diluted prior to use, although ready-to-use compositions can also be made. The final dilution is usually made with water, but can be made instead of, or in addition to, water, with, for example, liquid fertilizers, micronutrients, biological organisms, oil or solvents.

The present invention further relates to an herbicidal composition in form of aqueous dispersions comprising A) at least one ALS-inhibiting herbicide from the class of triazolinones; B) at least one HPPD-inhibiting herbicide from the class of triketones; C) a glyphosate salt in aqueous solution, preferably the potassium salt; D) at least one safener selected from the group of acylsulfonamides; E) at least an alkyl ether phosphate surfactant component E1) and at least one alkyl polyglycoside surfactant component E2), and F) to H) optionally further non-active ingredients like additives and formulation auxiliaries.

In one preferred embodiment, the component F) to H) are mandatory.

Further preferred, the sulfonylurea (ALS-inhibitor) and HPPD active ingredients are present in very low amounts, e.g. in a range from 0.1 to 0.2% and 2 to 3% w/w respectively.

The invention also relates to a method of controlling undesirable vegetation in the presence of a crop, particularly a corn crop, by applying to the locus of the crop or undesired vegetation a diluted herbicidal composition comprising a herbicidally effective amount of the HPPD, ALS derivative, in mixture with a water soluble herbicide, preferably glyphosate, and optionally in mixture or safeners according to the present invention.

The mixtures according to the instant invention of herbicidally active compounds (A) to (C) and safener (D) have good herbicidal activity, in particular for the control of unwanted plants in crops of corn; however, in practice they do not always have satisfactory properties, such as, for example, the storage stability of such mixtures is not always sufficient.

Further, there is an increasing demand by users for dilutions of agrochemical concentrates in a concentrated aqueous solution of fertilizers.

Thus, the fact that, when the user dilutes the mixture to obtain a spray liquor, the two active compounds are not always homogeneously distributed therein, in particular when the mixture is not to be diluted in water, but in a concentrated aqueous solution of fertilizers, has to be considered a further disadvantage.

Hence, there is a need for alternative surfactant systems, which allow the preparation of high loaded formulations with a high salt content according to the present invention, which provide chemically and physically stable formulations. Moreover, there is a need for said formulations having high storage stability and a homogeneous distribution of the active compounds and for an improved process for preparation of said formulations.

The object of the instant invention is therefore also to provide a surfactant combination which does not show the disadvantages of the chemical instability known in the art for high loaded formulations with high salt content, while efficacy against herbs is still maintained. Further, it is an object to provide formulations of active ingredients comprising said surfactant systems as well as a process for their production.

The objective of the present invention has been met by providing an agrochemical composition comprising inhibitors of acetolactate synthetase (ALS) (A), especially triazolinones, a herbicidally active compound from the group of the inhibitors of hydroxyphenylpyruvate dioxygenase (HPPD) (B), especially triketones, water soluble herbicides, preferably glyphosate as the potassium salt, (C) and at least one safener (D) from the group of the acylsulfonamides, as well as E) at least an alkyl ether phosphate surfactant component E1) and at least one alkyl polyglycoside surfactant component E2).

Preferably the formulation relates to an aqueous dispersion comprising thiencarbazone-methyl, tembotrione, glyphosate-K (potassium salt) and cyprosulfamide in combination with the aforementioned surfactants.

The aqueous suspension concentrates according to the invention may additionally comprise further auxiliaries and additives customary in crop protection as said above, wherein those components in particular are:

F) pH adjuster [component F)]

G) thickeners and/or thixotropic agents [component G)]

H) biocides (preservatives) and defoamers [component H)]

In addition, they may also comprise further substances, such as colorants and fragrances, and anti-drift agents, tackifiers and penetrants and evaporation inhibitors.

The present invention also provides a process for the preparation of said agrochemical composition, wherein all the components are mixed together with a specific order.

This object is achieved by the special suspension concentrate of the present invention.

Last, it is also an object of the invention to propose a method of controlling undesired vegetation, comprising applying an effective amount of said agrochemical composition or of said agrochemical aqueous suspension to plants (crop or undesired ones), seeds or to the soil.

As used herein, the terminology "a surfactant system" in the sense of the present invention is a compound that lowers the surface tension (or interfacial tension) between two liquids, between a gas and a liquid, or between a liquid and a solid.

The present invention relates to the field of plant protection formulations, in particular herbicidal aqueous dispersions which are useful for the selective control of weeds and weed grasses in important plant crops.

However, due to their respective intrinsic properties, sulfonylurea (ALS-inhibitor) and HPPD-inhibiting herbicides are sensitive to chemical breakdown, particularly in liquid formulations with water as a carrier and sulfonylurea being particularly sensitive to hydrolysis and used below a concentration of 6%, and in the present of glyphosate-potassium, and as such these herbicides are typically mixed together just prior to application, a process known as tank-mixing.

Surprisingly, it has now been found that a specific surfactant combination can significantly chemically stabilize these herbicides in herbicidal compositions. Even more surprisingly is that the use of water instead of glycerine as the carrier in the composition of the instant invention enabled the chemical stabilization of a sulfonylurea herbicide used at a concentration below 0.2%. This is fully unexpected considering teachings of the prior art and was not obvious to the person skilled in the art.

The present invention thus provides a method to stabilize one or more actives formulated as suspension concentrates that are known to be chemically unstable in the presence of fertilizers or a water-soluble herbicide co-formulated in form of a salt solution in water. The solution provided as part of the present invention with a specific surfactant pair comprising an alkyl ether phosphate surfactant allows to co-formulate thus one or more actives as suspension concentrates in water together with water-soluble herbicides present as a salt solution in water as glyphosate, glufosinate, dicamba, used as their respective salts.

The ability to provide these herbicides as a stable "ready-mix" composition has several significant advantages. In addition to providing improved chemical stability, the herbicidal compositions of the present invention also provide comparable or improved biological function compared to tank-mixed compositions, both in terms of efficacy and selectivity.

Surprisingly it has now been found that the combination of a at least a surfactant selected from the group from alkyl ether phosphates E1) and at least one surfactant selected from the group of alkyl polyglucoside surfactant E2), can stabilize highly loaded high salt content formulations of active ingredients, in particular herbicides, preferably containing glyphosate and preferably with at least one further sulfonyl urea (ALS-inhibitor) active ingredient, and at least one HPPD active ingredient, at low loading of max. 0.2 and 3% w/w respectively.

Further, it has been shown that the storage stability of these formulations (both physical but especially chemically) may be markedly improved using a combination of thiencarbazone-methyl, tembotrione, water soluble herbicide, preferably glyphosate-potassium salt, and cyprosulfamide together with a specific surfactant combination from the class of alkyl ether phosphates and alkyl polyglycosides.

In addition, the biological efficacy of such all-in-one combination of herbicides is at least, if not better, comparable to the use of the herbicides alone as a tank-mix application.

It has unexpectedly also been found that pre-mix formulations of the above ingredients component A) to D), and especially component E) with component E1)+component E2) provide an improved level of weed control and crop selectivity compared to tank mixtures, and accordingly the pre-mix formulations form a preferred aspect of the present invention.

Surprisingly, said surfactant combination comprising component E1) and component E2) in a specific amount remarkably enhances the stability in particular of the thiencarbazone-methyl of component A) and of tembotrione as of component B) in the presence of a water-soluble herbicide as component C) in the present composition.

The herbicidal composition of the present invention can be a "solid" formulation, for example, a water dispersible granule (WG) but is preferably a liquid composition—in particular a "suspension concentrate" (SC) especially wherein the herbicide components are present in suspension in water and the water soluble herbicide, e.g. glyphosate salt, in solution.

In a preferred embodiment the median particle size diameter of the herbicides and the safener in the liquid herbicidal composition is about ten microns or less, as compositions comprising particles of this size have been shown to exhibit improved physical stability.

Thus, according to the present invention there is provided an herbicidal composition comprising in form of a water-based suspension concentrate:

A) at least one sulfonylurea acetolactate synthase (ALS)-inhibiting herbicide from the family of triazolinone [component A)];
B) at least one triketone HPPD-inhibiting herbicide from the triketone class [component B)], preferably temotrione and mesotrione;
C) water soluble herbicide, [component C)]; preferably a glyphosate salt, more preferably the potassium salt;
D) at least one safener selected from the group of acylsulfonamides [component D)];
E) a surfactant combination [component E)] comprising at least an alkyl ether phosphate surfactant component E1) and at least one alkyl polyglycoside surfactant component E2);

and water, or glycerine, wherein the sum of the components is 100%.

One Embodiment of the instant invention is directed to a single liquid-phase herbicide composition comprising by weight of the composition:

A) From 0.1 to 1% thiencarbazone-methyl
B) From 2 to 15% tembotrione
C) From 50 to 70% of glyphosate-potassium 47.3 TK (TK=technical concentrate)
D) From 0.3 to 3% of safener cyprosulfamide
E) From 3 to 15% of a surfactant combination comprising at least an alkyl ether phosphate surfactant (component E1) and at least one alkyl polyglycoside surfactant (component E2)
F) From 2 to 10% of citric acid anhydrous
G) From 0.1 to 0.3% of one or more rheological additives (thickener and/or thixotropic agents)
H) From 0.3 to 3.6% of formulation auxiliaries (biocides, antifoam)
I) At least from 10 to 20% water or, in an alternative embodiment, 7 to 18% glycerine.

Most preferred is an aqueous dispersion comprising:

A) From 0.1 to 0.5% thiencarbazone-methyl
B) From 2 to 7.5% tembotrione
C) From 55 to 65% of glyphosate-potassium 47.3 TK (TK=technical concentrate, i.e. the TK comprises the salt in 47.3 wt %)
D) From 0.3 to 1.5% of safener cyprosulfamide
E) From 3 to 14% of a surfactant combination comprising at least an alkyl ether phosphate surfactant (component E1) and at least one alkyl polyglycoside surfactant (component E2)
F) From 2 to 5% of citric acid anhydrous
G) From 0.1 to 0.2% of one or more rheological additives
H) From 0.3 to 3.6% of formulation auxiliaries (biocides, antifoam)
I) At least from 10 to 20% water or in an alternative embodiment 7 to 18% glycerine.

Even more preferred is an aqueous dispersion comprising:

A) From 0.1 to 0.2% thiencarbazone-methyl
B) From 2 to 3% tembotrione
C) From 59 to 62% of glyphosate potassium 47.3 TK (TK=technical concentrate)
D) From 0.3 to 0.6% of safener cyprosulfamide
E) From 3 to 14% of a surfactant combination comprising at least one alkyl ether phosphate surfactant (component E1) and at least one alkyl polyglycoside or alkyl polyglucoside surfactant (component E2)
F) From 2 to 5% of citric acid anhydrous
G) 0.1 to 0.2% of one or more rheological additives
H) From 0.3 to 3.6% of formulation auxiliaries (biocides, antifoam)
I) At least from 10 to 20% water or from 7 to 18% glycerine.

Disclosed are a single liquid-phase herbicide composition comprising by weight of the composition:

A) from 0.1 to 0.2% of thiencarbazone-methyl;
B) from 2 to 3% of tembotrione;
C) from 59 to 62% of glyphosate potassium 47.3 wt % TK (TK=technical concentrate); and
D) from 0.3 to 0.6% of safener cyprosulfamide;
E) from 5 to 14% of a surfactant combination comprising poly(oxy-1,2-ethanediyl),α-hydro-ω-hydroxy-, mono-$C_8$-$C_{10}$-alkyl ethers, phosphates [alkylether phosphate (Alkyl polyethylene glykol ether phosphoric acid ester), non-amine salts] CAS Number 68130-47-2 E1) and at least one alkyl polyglycoside or alkyl polyglucoside surfactant E2);
F) from 2 to 5% of citric acid anhydrous;
G) 0.1 to 0.2% of one or more rheological additives;
H) from 0.3 to 3.6% of formulation auxiliaries (biocides, antifoam) and
I) from 10 to 20% water or, in an alternative embodiment, 7-18% of glycerine as a liquid carrier.

Water or glycerine is used as filler. Water is preferably present from 10 to 20% and glycerine from 7 to 18%.

This invention also relates to a process for preparing said composition, the process comprising milling components A), B), C) and D) together in a liquid carrier comprising components E) and I).

The term "single liquid-phase composition" and derivative terms such as "single liquid-phase herbicide composition" refer to compositions consisting of a single liquid phase. The term "single liquid-phase composition" therefore excludes compositions comprising a plurality of liquid phases such as emulsions. The term "single liquid-phase composition" does not exclude compositions comprising one or more solid phases in addition to the single liquid phase, such as suspensions and dispersions of solid particles.

The liquid carrier of this composition comprises component I) and provides a continuous liquid medium in which other components are dissolved or dispersed. As will be described further, components A), B) both of which are herbicidal, and D), being a safener, are suspended as solid particles in the present composition, and accordingly the composition can be regarded as a herbicidal aqueous dispersion formulation, i.e. a suspension of solid particles of components A), B) and D) dispersed in water [component I)]. In an alternative embodiment, as described above, the liquid carrier can be glycerine or a mixture of glycerine and water.

Herbicidally active compounds are generally not employed in their pure form. Depending on the area of use and the type of application, and on physical, chemical and biological parameters, the active compounds are employed as an active compound formulation in a mixture with customary auxiliaries and additives. Many herbicides display unwanted phytotoxic properties against useful plants.

To increase the herbicidal activity against a large number of unwanted plants and reduce the phytotoxic properties, the combined application of at least one herbicidally active compound and a safener may be expedient.

Preferably, the ALS-inhibiting herbicide is a sulfonylurea herbicide. The sulfonylurea herbicide is preferably selected from the group consisting of, triazolinone sulfonylurea herbicide. Of note is at least 90%, 95%, 98% or 99% of the thiencarbazone-methyl being in the form of suspended solid rather than dissolved. In the present composition, the thiencarbazone-methyl of component A) is typically in the free acid form having the molecular structure depicted as formula (I), rather than as a salt (e.g., wherein the sulfonylurea bridge —$S(O)_2NHC(=O)N$— is deprotonated).

Preferably the Sufonylurea Herbicide is a herbicidally active compound of formula (I) [component A)] in suspended form (I)

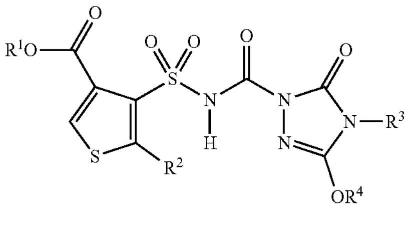

in which $R^1$, $R^2$, $R^3$ and $R^4$ independently of one another are methyl or ethyl, Particularly preferred is when $R^1$, $R^2$, $R^3$ and $R^4$ independently of one another are methyl.

Particularly preferred is thiencarbazone-methyl.

In the present composition, thiencarbazone-methyl component A) is included in an amount of 0.1 to 1% by weight. More typically, the amount of thiencarbazone-methyl is at least 0.1%, and not more than 0.5%, or even more preferred not more than 0.2% of the composition by weight.

This low concentration of thiencarbazone-methyl accommodates the inclusion of not only the other required components and other formulating auxiliaries, but also greater concentrations of other optional active ingredients, including herbicides that are typically applied at application rates much greater than thiencarbazone-methyl. It is also at this low concentration that, in the absence of a stabilizer, thiencarbazone-methyl is found to be insufficiently stable on storage on contact with the liquid medium comprising water in the presence of a surfactant having an emulsifier property and a considerable amount a water-soluble herbicide, present in form of a soluble salt.

Ratio Between the Herbicidal Actives A) and B):

The weight ratio of triazolinone A):triketone B) in the agrochemical composition according to the invention when the triketone is tembotrione, the range can be more preferably from 1:30 to 1:10, more preferred from 1:18 to 1:12; even more preferred 1:10 to 1:15.

The most preferred ratio between component A) and component B) is 1:15.

Component B)

Triketones (HPPD inhibitors) are known as herbicides. Triketones are herbicides for controlling unwanted vegetation belonging to the F2 classification according to the Herbicide Resistance Action Committee (HRAC). Their mechanism of action is based on the inhibition of the pigment synthesis (also called bleaching herbicides).

Mesotrione (IUPAC name 2-(4-methylsulfonyl-2-nitrobenzoyl)-cyclohexane-1,3-dione), tembotrione (IUPAC name 2-[2-chloro-4-methylsulfonyl-3-(2,2,2-trifluoroethoxymethyl)benzoyl] cyclohexane-1,3-trione), sulcotrione (IUPAC name 2-[2-chloro-4-(methylsulfonyl)-benzoyl]-1,3-cyclohexanedione) and tefuryltrione (IUPAC name 2-[2-chloro-4-methylsulfonyl-3-(oxolan-2-ylmethoxymethyl) benzoyl] cyclohexane-1,3-dione) are all commercial herbicides.

The herbicidally active compound of the formula (II) [(component B)] is in a preferred embodiment a triketone (2-benzoyl-1,3-cyclohexanedione) of formula (II), (II)

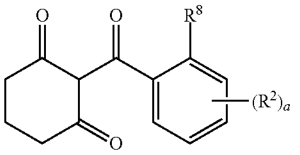

wherein:

$R^8$ is selected from the group consisting of halogen, nitro, $C_{1-4}$ alkyl, $C_{1-4}$ haloalkyl, $C_{1-6}$ alkoxy, $C_{1-6}$ alkoxy-$C_{1-6}$ alkyl, $C_{1-6}$ alkoxy-$C_{2-6}$ alkoxy, $C_{1-6}$ alkoxy-$C_{2-6}$-alkoxy-$C_{1-6}$ alkyl, $C_{1-4}$ haloalkoxy and $C_{1-4}$ haloalkoxy-$C_{1-4}$ alkyl.

Preferably, $R^8$ is chloro, methylsulfonyl or trifluoromethyl.

With regard to compounds of formula (II) $(R^2)_a$ is preferably selected from the group consisting of hydrogen, methylsulfonyl, trifluoromethyl and 2,2,2-trifluoroethoxymethyl or a combination thereof.

When $R^8$ is chloro and $(R^2)_a$ is 4-(methylsuphonyl)-3-(2,2,2-trifluoroethoxy)methyl the compound is tembotrione.

Preferred compounds of formula (II) are 2-(2'-nitro-4'-methylsulphonylbenzoyl)-1,3-cyclohexanedione (mesotrione), 2-(2'-nitro-4-methylsulphonyloxybenzoyl)-1,3-cyclohexanedione, 2-(2'-chloro-4'-methylsulphonylbenzoyl)-1,3-cyclohexanedione (sulcotrione), 2-[2-chloro-4-(methylsuphonyl)-3-(2,2,2-trifluoroethoxy]methyl] benzoyl]-1,3-cyclohexanedione (tembotrione), 4,4-dimethyl-2-(4-methanesulphonyl-2-nitrobenzoyl)-1,3-cyclohexanedione, 2-(2-chloro-3-ethoxy-4-methanesulphonylbenzoyl)-5-methyl-1,3-cyclohexanedione and 2-(2-chloro-3-ethoxy-4-ethanesulphonylbenzoyl)-5-methyl-1,3-cyclohexanedione.

Preferred herbicidal active substances from the group of the HPPD inhibitors, especially triketones, are benzobicyclon, isoxaflutole, mesotrione, pyrasulfotole, pyrazolynate, sulcotrione, tefuryltrione, tembotrione, topramezone and 3-({2-[(2-methoxyethoxy)methyl]-6-(trifluoromethyl)pyridin-3-yl}carbonyl)bicyclo[3.2.1]octane-2,4-dione, tolpyralate, fenpyrozone and tripyrasulfone, fentrazamide, bycyclopyrone.

In the agrochemical composition according to invention the triketone is advantageously selected from the group consisting of mesotrione, tembotrione, sulcotrione.

Particularly preferred is wherein the HPPD-inhibiting triketone herbicide is tembotrione.

In the present composition, component B) is present in an amount of 2 to 15% by weight, more preferred from 2% to 7.5% by weight, or most preferred from 2% to 3% of the composition by weight.

The preferred ratio between component B) and component D) is 5:1.

This low concentration of component B), in particular tembotrione, accommodates the inclusion of not only the other required components and other formulating auxiliaries, but also greater concentrations of other optional active ingredients, including herbicides that are typically applied at application rates much greater than tembotrione. It is also at this low concentration that, in the absence of a stabilizer, compounds of component B), in particular tembotrione, is found to be insufficiently stable on storage on contact with the liquid medium comprising water in the presence of a surfactant having an emulsifier property and a considerable amount a water-soluble herbicide, present in form of a soluble salt.

In the present composition, the component B) is typically in the free acid form having the molecular structure depicted as formula (II), rather than as a salt (e.g., wherein the triketone is deprotonated).

It should be understood that reference to the herbicides above—as well as in general for compounds of the instant invention—also includes, for example, reference to tautomers and agriculturally acceptable salts thereof. Examples of agriculturally acceptable salts include alkali metal salts such as sodium or potassium, alkaline earth metal salts such as magnesium or calcium, amine salts such as a monomethyl amine, dimethylamine, triethylamine, ammonium salts or dimethyl ammonium salts. The herbicide may also be provided as a metal chelate. Metal ions which may be useful in forming the metal chelate include di- and trivalent transition metal ions such as Cu2+, Zn2+, Co2+, Fe2+, Ni2+ and Fe3+.

The invention also relates agriculturally acceptable salts of the compounds of formula (II) as well as for other compounds of the instant invention. Such salts include those which may form with amines, alkali metal and alkaline earth metal bases or quaternary ammonium bases.

By the term "agriculturally acceptable salts" is meant salts the cations of which are known and accepted in the art for the formation of salts for agricultural or horticultural use. Preferably the salts are water-soluble.

Among the alkali metal and alkaline earth metal hydroxides, oxides, alkoxides and hydrogen carbonates and carbonates used as salt formers, emphasis is to be given to the hydroxides, alkoxides, oxides and carbonates of lithium, sodium, potassium, magnesium and calcium, but especially those of sodium, magnesium and calcium. The corresponding trimethylsulfonium salt may also be used.

The compounds of formula (II) according to the invention also include hydrates which may be formed during the salt formation.

By the term "metal complexes" is meant compounds wherein $R^4$ represents hydrogen (or a tautomer thereof) in which one or more of the oxygen atoms of the 2-benzoyl derivatives of formula (II) act as chelating agents to a metal cation. Examples of such cations include zinc, manganese, cupric, cuprous, ferric, ferrous, titanium and aluminium.

The present invention also includes agronomically acceptable salts that the compounds of Formula (II) may form with amines (for example ammonia, dimethylamine and triethylamine, diethanolamine, triethanolamine, octylamine, morpholine and dioctylmethylamine), alkali metal (eg. sodium and potassium) and alkaline earth metal bases (eg. calcium and magnesium), or quaternary ammonium bases.

Further examples of amines suitable for ammonium salt formation include ammonia as well as primary, secondary and tertiary $C_1$-$C_4$ alkylamines, $C_1$-$C_4$ hydroxyalkylamines and $C_2$-$C_4$ alkoxyalkylamines, for example methylamine, ethylamine, n-propylamine, isopropylamine, the four butylamine isomers, n-amylamine, isoamylamine, hexylamine, heptylamine, octylamine, nonylamine, decylamine, pentadecylamine, hexadecylamine, heptadecylamine, octadecylamine, methylethylamine, methylisopropylamine, methylhexylamine, methylnonylamine, methylpentadecylamine, methyloctadecylamine, ethylbutylamine, ethylheptylamine, ethyloctylamine, hexylheptylamine, hexyloctylamine, dimethylamine, diethylamine, di-n-propylamine, diisopropylamine, di-n-butylamine, di-n-amylamine, diisoamylamine, dihexylamine, diheptylamine, dioctylamine, ethanolamine, n-propanolamine, isopropanolamine, N,N-diethanolamine, N-ethylpropanolamine, N-butylethanolamine, allylamine, n-but-2-enylamine, n-pent-2-enylamine, 2,3-dimethylbut-2-enylamine, dibut-2-enylamine, n-hex-2-enylamine, propylenediamine, trimethylamine, triethylamine, tri-n-propylamine, triisopropylamine, tri-n-butylamine, triisobutylamine, tri-sec-butylamine, tri-n-amylamine, methoxyethylamine and ethoxyethylamine; heterocyclic amines, for example pyridine, quinoline, isoquinoline, morpholine, piperidine, pyrrolidine, indoline, quinuclidine and azepine; primary arylamines, for example anilines, methoxyanilines, ethoxyanilines, o-, m- and p-toluidines, phenylenediamines, benzidines, naphthylamines and o-, m- and p-chloroanilines; but especially triethylamine, isopropylamine and diisopropylamine.

Depending on the nature of the substituents, compounds of formula (II) may exist in different isomeric forms. When Compound B) is a triketone as in formula (II), for example, those compounds of formula (II) may exist in different tautomeric forms.

The salts of the HPPD inhibitors which can thus be obtained are also suitable as component B) in the dispersions according to the invention. Examples of suitable bases are ammonia, the hydroxides, carbonates and hydrogen carbonates of zinc, alkali metals and alkaline earth metals such as sodium, potassium, calcium and magnesium, and organic bases of the formula $NR^1R^2R^3$ where $R^1$, $R^2$ and $R^3$ are in each case ($C_1$-$C_6$)-alkyl, ($C_2$-$C_6$)-alkenyl or ($C_2$-$C_6$)-alkynyl, and $R^2$ and $R^3$ can additionally also be hydrogen. The potassium, sodium and ammonium salts are preferred._The herbicide may also be provided as a metal chelate. Metal ions which may be useful in forming the metal chelate include di- and trivalent transition metal ions such as $Cu^{2+}$, $Zn^{2+}$, $Co^{2+}$, $Fe^{2+}$, $Ni^{2+}$ and $Fe^{3+}$.

This invention covers all such isomers and tautomers and mixtures thereof in all proportions. Also, when substituents contain double bonds, cis- and trans-isomers can exist. These isomers, too, are within the scope of the claimed compounds of the formula (II). Compounds of formula (II) may contain asymmetric centers and may be present as a single enantiomer, pairs of enantiomers in any proportion or, where more than one asymmetric center are present, contain diastereoisomers in all possible ratios. Typically, one of the enantiomers has enhanced biological activity compared to the other possibilities.

For the production of active substances on the industrial scale but also for the formulation of active substances, in many cases knowledge concerning the possible existence of crystalline modifications (also described as crystalline forms) or of solvates of the active substance in question, and knowledge of the specific properties of such modifications and solvates and of methods for their preparation are of decisive importance. A range of active substances can exist in amorphous modifications but also in in different crystalline modifications. Polymorphism is the term used in these latter case. A polymorph is a solid, crystalline phase of a compound which is characterized by a specific, uniform packing and arrangement of the molecules in the solid.

By the term "polymorph" is meant a particular crystal form of a chemical compound that can exist in more than one crystal form in the solid state. A crystal form of a compound contains the constituent molecules arranged in orderly repeating patterns extending in all three spatial dimensions (in contrast, an amorphous solid form has no long-range order in the position of molecules). Different polymorphs of a compound have different arrangements of atoms and or molecules in their crystal structure. When the compound is a biologically active compound, such as an herbicide, the difference in crystal structures can lead to different polymorphs having differing chemical, physical and biological properties. Properties which may be affected include crystal shape, density, hardness, colour, chemical stability, melting point, hydroscopicity (water solubility), lipophilicity, suspensibility, dissolution rate and biological availability. As such, a specific polymorph may have properties which make it more advantageous in a particular use relative to another polymorph of the same compound: in particular, the physical, chemical and biological properties listed above can have a significant effect on the development of production methods and formulations, the ease with which a compound can be combined in a formulation with other active ingredients and formulation components and the quality and efficacy of plant treatment agents, such as herbicides. It is noted that predicting whether the solid state of a compound may be present as more than one polymorph is not possible and nor is it possible to predict the properties of any of these crystal forms.

In particular, the use of a specific polymorph may allow use of new formulations compared with existing polymorphic/amorphous forms of a compound. This might be advantageous for several reasons. For example, a suspension concentrate (SC) formulation may be preferred over an emulsion concentrate (EC) because the lack of solvent in the SC often means that the formulation is likely to be less phytotoxic than an equivalent EC formulation—however, if the existing form of a compound is not stable in such an SC formulations, polymorphic conversion might occur leading to unwanted crystal growth. Such crystal growth is detrimental because it leads to, for example, thickening and potentially solidification of the formulation during production which can lead to blockages in application equipment, e.g. in spray nozzles in agricultural application machinery. Using a stable polymorphic form would overcome these issues.

The stability of formulations which contain the compound of formula (II) in its most stable polymorph is also markedly higher than the stability of formulations which contain the compound of formula (II) in amorphous form.

Different modifications of one and the same active substance can sometimes have different properties, for example differences in the following properties: solubility, vapor pressure, dissolution rate, stability against a phase change into a different modification, stability during grinding, suspension stability, optical and mechanical properties, hygroscopicity, crystal form and size, filterability, density, melting point, stability to decomposition, color, chemical reactivity or biological activity.

Suitable use of the active ingredient of formula (II) is also in its especially preferred solid forms as crystalline form which may contain only one polymorph.

Component C)

In the context of the present invention water-soluble herbicidal active crop protectant ingredients [component C) active ingredient] such as glufosinate, dicamba and glyphosate present as in their respective salts, have a water solubility at 20° C. and 1013 mbar (typically at a pH in the range of 4-7, depending on the form) of at least 5 g/L or higher, preferably of at least 10 g/L or higher, more preferably of at least 20 g/L or higher.

Preferably, the water-soluble herbicides are selected from the group of glyphosate, glufosinate or dicamba or their respective salts as described herein.

To allow a high concentration of one or more water-soluble herbicidal active crop protectant ingredients [component C) active ingredients] in the compositions in the context of the present invention are preferably used in form of their salts since these generally speaking show higher water solubility.

Component C) is preferably present in an amount from 50 to 70% by weight, more preferred from 55 to 65% by weight and most preferred from 59 to 62% by weight.

Most preferred water-soluble active ingredient is glyphosate used in form of its potassium salt used as a stock solution, a TK technical concentrate of 47.3 wt % [component C)].

In one embodiment where glyphosate is glyphosate potassium salt technical concentrate (TK) at 47.3_wt % preferably it (TK) is contained from 50 to 70% by weight, preferably from 59 to 62% by weight.

Component D)

A safener of the formula (III) [component D)], (III)

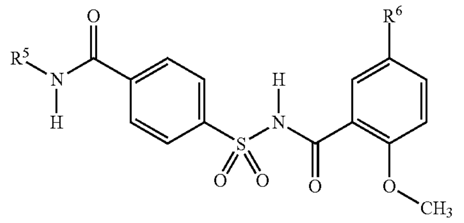

in which $R^5$ is isopropyl or cyclopropyl and $R^6$ is hydrogen or chloro.

Particularly preferred is the safener cyprosulfamide, where $R^5$ is isopropyl and $R^6$ is hydrogen.

In the present composition, component D) is included in an amount of 0.3 to 3% by weight. More typically, the amount of cyprosulfamide is at least 0.3%, and not more than 1.5%, or even more preferred not more than 0.6% of the composition by weight. This low concentration of cyprosulfamide accommodates the inclusion of not only the other required components and other formulating auxiliaries, but also greater concentrations of other optional active ingredients, including herbicides that are typically applied at application rates much greater than cyprosulfamide.

Component E) are dispersants comprising at least one alkyl ether phosphate and at least one other dispersant selected from the group consisting of alkyl polyglycosides and alkyl polyglucosides.

Component E1) is defined as dispersants selected from the group comprising poly(oxy-1,2-ethanediyl),α-hydro-ω-hydroxy-, mono-$C_5$-$C_{10}$-alkyl ethers, phosphates (alkyl ether phosphate as alkyl polyethyleneglykol ether phosphoric acid ester, non-amine salts) CAS Number 68130-47-2 and component E2) is defined as at least one other dispersant selected from the group consisting of alkyl polyglycosides (CAS Number 68515-73-1; 132778-08-6).

Specifically E1) is an alkyl ether phosphate.

Alkyl phosphates and alkyl ether—a synonym is also often used the term organophosphate—are known anionic emulsifiers, which are usually prepared by the reaction of long-chain alcohols or their ethylene oxide with phosphorus pentoxide or Polyphosphoric acid, which is important for the properties of mono/diester ratio you could select the phosphating agent and the stoichiometric operating conditions. Usually follow the alkyl ether phosphates of the formula (IV), (IV)

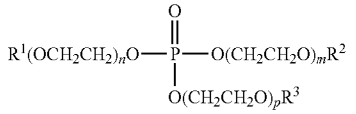

in which $R^1$ is a linear or branched alkyl and/or alkenyl group containing 6 to 22 carbon atoms, $R^2$ and $R^3$ independently represent hydrogen or also represents a linear or branched alkyl and/or alkenyl group containing 6 to 22 carbon atoms, and the sum (m+n+p) is 0 or a number 1 to 30. Preferably, the use of such alkyl ether phosphates in which $R^1$ and $R^2$ are alkyl groups containing 8 to 18 carbon atoms, $R^3$ is hydrogen and the sum (m+n+p) is the number 4 to 20. Typical examples are the phosphate products of fatty alcohols, such as caproic alcohol, caprylic alcohol, capric alcohol, lauryl alcohol, myristyl alcohol, palmoleyl alcohol, cetyl alcohol, stearyl alcohol, isostearyl alcohol, oleyl alcohol, elaidyl alcohol, petroselinyl alcohol, gadoleyl alcohol, arachydylalkohol, behenyl alcohol and erucyl alcohol and the technical mixtures obtained by hydrogenation of corresponding fatty acid alkyl esters are obtained. Preferred is the use of alkyl phosphates or alkyl ether based on technical $C_8$-$C_{10}$ or $C_{12}$-$C_{18}$. Mostly preferred is a mixture of $C_5$-$C_{10}$, $C_8$, $C_{10}$ alkyl.

It may also be used mixtures of alkyl phosphates and alkyl ether, in particular those which are obtained by joint phosphating of fatty alcohols and fatty alcohol polyglycol ethers. It has proved advantageous, alkyl (ether) phosphate use, which are predominantly are mono/diester mixtures having so little or no play of tri-esters. Depending on the specific application field, it may therefore be either preferred to use products where it is monoester or diesters mainly and not a mixture of both.

Mostly preferred use is characterized in that alkyl ether phosphates are predominantly mono/diesters are mixtures.

Mostly preferred use is characterized in that alkyl ether phosphates are mainly Monoester.

Most Preferred is when $R^1$ and $R^2$ are alkyl groups containing 8 to 18 carbon atoms, most preferred 8 to 10, $R^3$ is hydrogen and p=0 and the sum (n+m) is the number 8 to 20, most preferred 8 to 10.

Even more preferred is when $R^1$ is an alkyl group containing 8 to 18 carbon atoms, most preferred 8 to 10, even more preferred a mixture of 8 and 10, $R^2$ and $R^3$ are hydrogen and p=m=0 and n is the number 4 to 20, most preferred 4 to 5.

Typically, the emulsifiers may be used in amounts of from 1 to 15, preferably 2 to 10 and in particular 3 to 5%.

In the present composition, the stabilizing dispersant pair as per component E) is preferably present in an amount of 3 to 15% by weight, more preferred from 3 to 14% by weight, and most preferred the amount of the dispersants E1) and E2) is from 5%, to 14%.

In one embodiment in the formulation the surfactant combination the total proportion of dispersants in the suspension concentrates according to the invention comprising at least an alkyl ether phosphate surfactant and at least one alkyl polyglucoside surfactant is generally between 1 and 15% by weight, preferably present in 5 to 14% by weight, and most preferred in 5% by weight.

The ratio of E1) to E2) is preferably from 10:1 to 1:10, more preferred from 2:1 to 2:10, and most preferred is 4:1.

More specifically component E1) is an alkyl ether phosphate with following composition:

1) $C_5$-$C_{10}$, $C_8$, or $C_{10}$ alkyl
2) EO number between 4 and 5
3) Monoester content 65-80%
4) Diester content <10%

Preferably, the alkyl ether phosphate comprises a chain where $R^1$ is of at least 8 and max 10 carbon atoms, or more preferably a mixture thereof, where p is =m=0 and $R^2$=$R^3$=H. Preferably, the EO ethoxylation number n is between 4 and 5. The monoester content is preferably 65-80%. The diester content is preferably <10%.

The alkyl ether phosphate is preferably selected from the group consisting of $C_8$-$C_{10}$ or $C_8$ or $C_{10}$ alkyl chain, octanoic or decanoic chain length. The concentration of the alkyl ether phosphate in the composition is typically, for example, from 1% to 15% by weight, preferably from 2% to 4% by weight and even more preferably 4% by weight.

Alkyl polyglucosides (APGs) are used in agrochemical formulations for various reasons, such as surfactants for wetting, and they are known to have stabilizing effects when used in high-salt content formulations of actives or simply fertilizers. These stabilizing effects allow more biological activity to be gained from the application of a agrochemical to a plant or crop, since the active is chemically more stable. The fundamental performance of APGs as chemical stability enhancing surfactants alone is however rather poor and does not work with all active classes. Examples in the literature indicate that there are many better surfactants which could be used instead. The literature does not provide any direction about mixtures of APG surfactants with other better stabilizers. Examples of recipes using APGs with other surfactants are known, however there is nothing to indicate that these mixtures are better when sued with herbicide combinations as depicted in the present invention.

More specifically component E2) is an alkyl polyglycoside (APG) with following composition of formula (IV):

(IV)

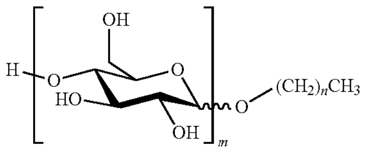

where n is a mean value and is from 7 to 11; and m is a mean value and is from 1 to 3. (n+1 is the mean number of carbon atoms in the hydrophobic tail of the APG; and m is the mean number of sugar rings on the hydrophilic head group of the APG)

There are several advantages which can be gained by using a mixture of an APG with another stabilizer. The inclusion of the APG can reduce the overall cost of the formulation, it can alter its aqueous dilution properties and it can alter the toxicology of the formulation.

Suitable APG commercial products, according to formula (II) are provided in Table A:

TABLE A

| APG | Tail carbon atoms | Mean number of Sugar rings (m) | Griffin HLB |
|---|---|---|---|
| Agnique ® PG8105 | from 8 to 10 | 1.5 | 13.2 |
| Agnique ® PG8107 | from 8 to 10 | 1.7 | 13.6 |
| Agnique ® PG9116 | from 9 to 11 | 1.6 | 13.1 |
| Agnique ® PG8166 | from 8 to 16 | 1.6 | 12.8 |
| Agnique ® PG266 | from 12 to 16 | 1.6 | 12.8 |

n+1 is the mean number of carbon atoms in the hydrophobic tail of the surfactant. Preferably n is from 7 to 15; more preferably n is from 7 to 13; and even more preferably it is from 7 to 11. m is the mean number of sugar rings on the hydrophilic head group of the APG. Preferably m is from 1 to 3; more preferably m is from 1 to 2; most preferably m is from 1.4 to 1.8.

Specifically, under component E1) is to understand Multitrope® 1214 (CRODA) and under component E2) alkyl polyglycoside having a $C_5$-$C_{10}$ or $C_9$-$C_{11}$ backbone, more specifically Multitrope® 1620 (CRODA); Agnique® PG 8107, Agnique® PG 8105, Agnique® PG 8116 (BASF).

Most preferred is here under component E2) Multitrope® 1620 from CRODA.

Component F)

The pH-adjuster can be selected from the group of citric acid, citric acid buffers, phosphate buffers, phosphorous acid and other such adjuvants know to one skilled in the art.

If the pH-adjuster is acid, it can be selected from the group of inorganic acids, such as o-phosphoric acid, a carboxylic acid, such as acetic acid, or an acidic surfactant, such as a sulfated or phosphated tristyrylphenol ethoxylate in acidic form, a sulfated or phosphated alkylphenol ethoxylate in acidic form, or a sulfated or phosphated alcohol ethoxylate in acidic form. Where the acid is an inorganic or carboxylic acid the content of the acid in the suspension is preferably between 2-10%, more preferably 2-5%. The acid is an optional component of the oil dispersion and can be an inorganic acid, such as o-phosphoric acid, a carboxylic acid, such as acetic acid, or an acidic surfactant, such as a sulfated or phosphated tristyrylphenol ethoxylate in acidic form, a sulfated or phosphated alkylphenol ethoxylate in acidic form, or a sulfated or phosphated alcohol ethoxylate in acidic form.

Preferably anhydrous citric acid is used as pH adjuster, component F).

Where the acid is an inorganic or carboxylic acid the content of the acid in the dispersion is preferably between 2-10% by weight, more preferably between 2-5% by weight.

The pH of the formulation measured at 100% solution, is set to be in the range 4 to 5, more preferred 4-4.5. This value is obtained with component F) and with the alkyl ether phosphate component E1), specifically Multitrope® 1214 (from CRODA).

Component G)

Although optional, particularly if the present composition is used soon after preparation, typically one or more thickening agents (also known as thickeners, rheology modifiers or suspending agents) are included as part of component G) to prevent undesirable phase separation and/or sedimentation of solid particles [e.g., of components A) and B) and D)] that can occur in unstructured suspension concentrates during storage. Thickening agents increase the viscosity of the continuous liquid medium in which solid particles [e.g., of components A) and B) and C)] are suspended and thus reduce their propensity to settle and form a separated, compact sediment during storage. Also, a thickening agent may improve the efficiency of a wet milling process used to prepare the present composition.

Thickening agents are well known in the art of formulations. For the present composition having a liquid carrier comprising water and a water-soluble herbicide salt as component C), thickening agents are generally selected from silicas and silicates, which may be naturally occurring, artificially produced, or organically modified or based on synthetic polymers or based on xanthan gum, naturally or modified.

When a thickening agent is present is the composition, it is typically at least 0.1%, more typically at least 0.5%, of the composition by weight. When a thickening agent is present, typically it is not more than 5%, and more typically not more than 4%, 3% or 2% of the composition by weight.

Rheological modifiers may be present in 0.01 to 1% by weight, more preferred in 0.1 to 0.3% by weight and most preferred from 0.1 to 0.2% by weight.

Suitable thickeners as component G) and thixotropic agents are, for example:

1) Silicates include phyllosilicate minerals having particles of less than 2 µm size present in naturally occurring clays, such as kaolinite and smectites (e.g., smectite, hectorite, attapulgite, montmorillonite), and their combinations such as bentonites. Clays comprising minerals of the smectite group generally can be organically chemically modified by cation exchange of metal ions with organic salts such as quaternary ammonium salts to increase hydrophobicity. Examples of modified natural silicates, such as chemically modified bentonites, hectorites, attapulgites, montmorillonites, smectites or other silicate minerals. Natural and modified clays are commercially available under a variety of trade names (e.g., Bentone® (Elementis), Attagel® (BASF), Agsorb® (Oil-Dri Corporation) or Hectorite® (Akzo Nobel)).
2) natural and synthetic silicates, such as silicas include synthetic precipitated or fumed silicas, which may be chemically (including organically) modified, for example with dimethyldichlorosilane, to increase hydrophobicity. Such silicas are commercially available under a variety of trade names (e.g., Sipernat® or Aerosil® (Evonik), CAB-O-SIL (Cabot) or Van Gel series (R. T. Vanderbilt)). An example of a hydrophilic fumed silica Aerosil® 200 (Evonik).
3) thickeners based on synthetic polymers, such as thickeners of the Thixin® or Thixatrol® series (Elementis),
4) thickeners based on xanthan gum, such as thickeners of the Rhodopol® (Solvay) or Satiaxane® series (Cargill).

Examples of thickeners are inorganic materials such as pyrogenic silica known under the trade name Aerosil® or Cab-O-Sil®, precipitated silica, montmorillonite type clays known under the trade name Attaclay® or Attagel®, bentonite, modified bentonites known under the trade name Bentone®. Further examples of thickeners are organic polymers such as polystyrene, polyesters, cellulose derivatives such as ethyl cellulose, alkylated polyvinylpyrrolidones. Examples of antifoams are perfluoro-alkyl phosphonic acid derivatives known under the trade name Fluowet® or silicon-based antifoams known under various trade names.

Preferred rheological additives/thickeners and thixotropic agents are, for example, xanthan gums.

Thickeners based on natural or modified xanthan gum work particularly well as thickening agents in the present composition.

In a particular preferred embodiment, the agrochemical composition according to the invention may further contain a xanthan gum suspending agent, more preferably selected from the group consisting of Rhodopol® G, and Rhodopol® 23 (Solvay) and Satiaxane® CX911 (Cargill).

The listed class of thickeners can be used alone or in combination; a suitable combination thereof is for example described in WO 20/025652A1

Component H)

If no glycerine is present in the formulation, suitable antifreeze agents may be present.

Suitable antifreeze agents [as component H)] are those from the group of the ureas, diols and polyols, such as ethylene glycol and propylene glycol. The proportion of antifreeze agents, if present in the suspension concentrates according to the invention is preferably between 0.1 and 34% by weight, in particular between 0.5 and 7%.

Further formulation auxiliaries may be present in 0.1 to 10% by weight, more preferred in 0.2 to 8% by weight and most preferred from 0.3 to 3.6% by weight.

Suitable preservatives [eg component H)] are those from the group of the isothiazoles, such as 2-methyl-2H-isothiazol-3-one, 1,2-benzisothiazol-3(2H)-one and the sodium salt. The proportion of preservatives in the suspension concentrates according to the invention is generally between 0.05 and 1% by weight, in particular between 0.08 and 0.2% by weight.

Suitable defoamers [eg component H)] are, for example, those based on sili-cones, in particular polydimethylsiloxanes, preferably Silcolapse® 416. The proportion of defoamers in the suspension concentrates according to the invention is generally between 0.05 and 1% by weight, in particular between 0.1 and 0.3% by weight.

Component I)

Carrier as component I) as mentioned above, the agrochemical composition according to the invention also comprises a carrier, either glycerine or water, most preferably water.

Preferably, crop protectant compositions in the instant application have a glycerine content of at least 7% by weight.

In one embodiment the water content is between 10% and 20% by weight.

In another embodiment the glycerine content is between 7% and 18% by weight (w/w). In a most preferred embodiment, the water content is between 19% and 20% by weight.

Preferably, crop protectant compositions in the instant application have a water content on top of the one combined with the glyphosate potassium technical concentrate (TK) (water content of TK not calculated) of at least 10% by weight. In one embodiment the water content is between 10% and 20% by weight (w/w).

Colorants and fragrances are known to the person skilled in the art.

Suspensions in which the solid active ingredients are finely dispersed in the water are preferred. Fine dispersions are conveniently obtained by grinding together the active ingredient(s) and the water, with one or more further formulation component(s). Preferably, the active ingredient is milled until the average particle size diameter is one micron or less. This can conveniently be achieved by using a bead mill.

As already noted, the present composition has a single liquid phase wherein the liquid carrier comprises as component I) water or glycerine, most preferably water. The single liquid phase requirement precludes the presence of liquid phases in addition to the continuous liquid phase formed by component I). Therefore, solid particles, such as of components A) and B) and D) can be suspended as a dispersion in the liquid phase formed by component I).

A variety of methods for reducing particle size of insoluble components in water-based suspensions are known in the art and suitable for preparing the present composition. These include ball-milling, bead-milling, sand-milling, colloid-milling and air-milling combined with high-speed blending. Ball-, bead- and sand-mills are media mills that achieve size reduction of particles by vigorous agitation with grinding media (e.g., balls or beads made of glass or ceramic, or sand). In ball-mills, typically the container rotates, while in bead- or sand-mills, grinding is achieved by an impeller in the grinding media. In horizontal bead-mills, agitation is by the action of an internal agitator rapidly rotating along the axis of the milling chamber. Colloid mills achieve size reduction of particles by passing the material to be ground through a narrow gap of a rapidly rotating rotor-stator assembly. Ball-milling, bead-milling, sand-milling and colloid-milling generally involve wet-milling (i.e. the liquid carrier is present). Air-milling is suitable for dry powders (e.g., present components A) and B) and D)), which would then be combined with liquid components (e.g., present component I)) and high-speed blended using high-speed impellers or dispergators (i.e. rotor-stator). For sake of convenience, the present components can be combined before milling.

Thus in this process for preparing the composition of the invention, components A) and B) and D) are milled together in a liquid carrier comprising components C), E) and I), and any other components (e.g., component F) and G) and H) are present either dissolved or as solid particulates in the milling mixture. Bead-milling has been found to work very well for preparing the present composition. The Examples of the present disclosure use a WAB Research mill (small Dyno-mill horizontal bead mills (Willy A Bachofen AG)) found capable of providing a particle size distribution (analyzed by Mastersizer 2000) having D10, D50 and D90 percentiles of 1.0-2.0 μm, 3.0-6.0 μm, and 9.0-15.0 μm, respectively. Similar particle size reduction can also be achieved on a larger scale by utilizing equipment such as, but not limited to, Dyno-mill horizontal bead mills (Willy A Bachofen AG) and related types of low energy mills or high energy mills, for instance those available from Netzsch (Netzsch-Feinmahltechnik GmbH) or Buhler (Buhler Group) and an Eiger Minimill, which is a labo-ratory-scale horizontal bead mill.

The herbicide composition according, further comprising one or more additional components selected from the group comprising, antioxidants, chemical stabilizers, adhesives, fertilizers, perfumes, colorants, liquid carriers, solid carriers, surface-active agents, crystallization inhibitors, suspending agents, spray droplet modifiers, pigments, foaming agents, light-blocking agents, compatibility agents, sequestering agents, corrosion inhibitors, freezing point depressants, odorants, spreading agents, penetration aids, micronutrients, emollients, lubricants, sticking agents and humectants.

Additional components needed to prepare the above formulations, such as surfactants in particular, are known in principle and are described for example in: McCutcheon's "Detergents and Emulsifiers Annual", MC Pub 1. Corp., Ridgewood N.J.; Sisley and Wood "Encyclopedia of Surface Active Agents", Chem. Publ. Co. Inc., N.Y. 1964; Schönfeldt, "Grenzflächenaktive Äthylenoxidaddukte", Wiss. Verlagsgesellschaft, Stuttgart 1976; Winnacker-Küchler, "Chemische Technologie", Volume 7, C. Hanser-Verlag, Munich, 4th Edition 1986, and references cited in each of these.

The abovementioned formulation auxiliaries of component G) and H) are known to the person skilled in the art and are described, for example, in: Watkins, "Handbook of Insecticide Dust Diluents and Carriers", 2nd Ed., Darland Books, Caldwell N.J., H.v. Olphen, "Introduction to Clay Colloid Chemistry"; 2nd Ed., J. Wiley & Sons, N.Y.; C. Marsden, "Solvents Guide"; 2nd Ed., Interscience, N.Y. 1963; McCutcheon's "Detergents and Emulsifiers Annual", MC Pub!. Corp., Ridgewood N.J.; Sisley and Wood, "Encyclopedia of Surface Active Agents", Chem. Pub. Co. Inc., N.Y. 1964; Schönfeldt, "Grenzflächenaktive Äthylenoxidaddukte (Surface-active ethylene oxide adducts)", Wiss. Verlagsge-sell, Stuttgart 1976; Winnacker-Küchler, "Chemische Technologie (Chemical technology)", volume 7, C. Hauser Verlag Munieh, 4th Ed. 1986.

The term adjuvant includes surfactants, such as wetting agents, emulsifiers, dispersing agents and/or organic solvents, mineral and vegetable oils and combinations thereof. Adjuvants, especially those which are suitable for agrochemical use, are for example known from Foy, C. L., Adjuvants for agrochemicals, CRC Press Inc., Boca Raton, Florida, USA.

Depending on the intended use, i.e. depending on which harmful plants are to be controlled in the crop plants in question, the aqueous suspension concentrates according to the invention also comprise a further agrochemically active compound, preferably from the group of the herbicides. This further herbicidally active compound may both be present in the aqueous suspension concentrate according to the invention as a ready formulation and be applied as a tank mix by joint dilution of the separately formulated or partially separately formulated components.

The suspension is diluted with water before use to produce an aqueous composition which is used in controlling plants or plant growth. Dilution in water results in a suspension. The invention also relates to a suspension obtained by dilution of an aqueous dispersion according to the present invention.

The invention also relates to a method of controlling plants which comprises applying to the plants or to the locus thereof a herbicidally effective amount of a suspension obtained by dilution of an oil dispersion according to the present invention.

The invention also relates to a method of inhibiting plant growth which comprises applying to the plants or to the locus thereof a herbicidally effective amount of a suspension obtained by dilution of an aqueous dispersion according to the present invention.

The invention also relates to a method of selectively controlling grasses and weeds in crops of useful plants which comprises applying to the useful plants or locus thereof or to the area of cultivation a herbicidally effective amount of a aqueous suspension obtained by dilution of an suspension according to the present invention.

For use, the aqueous suspension concentrates or herbicidal compositions according to the invention can be diluted in a customary manner, for example with water or with aqueous solutions of fertilizers, such as ammonium hydrogensulfate.

It may be advantageous to add, to the resulting spray liquors, further agrochemically active compounds (for example components for tank mixes in the form of suitable formulations) and/or customary auxiliaries and additives conventionally used for application and/or fertilizers. It has been found to be advantageous to dilute the aqueous suspension concentrates or herbicidal compositions according to the invention with aqueous solutions of fertilizers, for example ammonium nitrate and ammonium sulfate.

Fertilizers containing nitrogen are commonly classified as either nitrate or ammonium types. Commercially available ammonium types include anhydrous ammonia, aqueous ammonia, ammonium nitrate, ammonium sulfate, fluid nitrogen fertilizers and urea. The nitrate type fertilizers include ammonium nitrate, nitrogen solutions, calcium nitrate and sodium nitrate. The preferred fertilizers containing nitrogen are nitrogen solutions. The most preferred fertilizers containing nitrogen are urea ammonium nitrate (UAN) wherein the % N is from about 28% to about 33%; ammonium sulfate; urea; glycine, or mixtures thereof. The UAN solution and other nitrogen solutions can be prepared by processes known in the art.

The amount of fertilizer containing nitrogen used in the mixtures is generally from about 50-3000 g/ha, preferably from about 50-1500 g/ha, and more preferably from about 150-300 g/ha. Nitrogen is well known in the art as a fertilizer and is described in Farm Chemicals Handbook, 1988 Edition on pages B48 and B49. Commercially available nitrogen containing fertilizers include anhydrous ammonia, ammonium nitrate, ammonium sulfate, urea, nitrogen solutions (which include urea ammonium nitrate), potassium nitrate, and combinations thereof.

Whereas commercial products may preferably be formulated as concentrates, the end user will normally employ dilute formulations.

The rate at which the agrochemical compositions of the invention are applied will depend upon the particular type of insect etc. to be controlled, the degree of control required and the timing and method of application and can be readily determined by the person skilled in the art. In general, the compositions of the invention can be applied at an application rate of between 0.005 L/hectare (L/ha) and about 5.0 L/ha, based on the total amount of active ingredient [wherein 'active ingredient' means component B)] in the composition. An application rate of between about 1 L/ha and about 5 L/ha is preferred, with an application rate of between about 2.5 L/ha and 5 L/ha being especially preferred.

In practice, the agrochemical compositions from the invention are applied as a formulation containing the various adjuvants and carriers known to or used in the industry.

The aqueous suspension concentrates and herbicidal compositions according to the invention have outstanding herbicidal activity against a broad spectrum of economically important monocotyledonous and dicotyledonous harmful plants. They even effect good control of perennial problem weeds which emerge from rhizomes, root stocks or other perennial organs.

The aqueous suspension concentrates and herbicidal compositions according to the invention have prolonged herbicidal activity with prompt onset.

Although the aqueous suspension concentrates and herbicidal compositions according to the invention have an outstanding herbicidal activity against monocotyledonous and dicotyledonous weeds, crop plants of economically important crops, for example dicotyledonous crops such as soybeans, cotton, oilseed rape, sugar beet, or graminaceous crops such as wheat, barley, rye, oats and millet, sugar cane, coffee, tea, cocoa, coconut, bananas or corn only suffer minor damage, if any. This is why the aqueous suspension concentrates and herbicidal compositions according to the invention are highly suitable for the selective control of unwanted vegetation in plantations of agriculturally useful crops, in particular in corn crops, or in ornamental plantations.

The present invention furthermore also provides a method for controlling unwanted vegetation, preferably in crop plants such as cereals (for example wheat, barley, rye, oats, rice, corn, millet), sugar beet, sugar cane, oilseed rape, cotton and soybeans, particularly preferably in monocotyledonous crops, such as cereals, for example wheat, barley, rye, oats, their hybridization products, such as triticale, rice, corn and millet, one or more aqueous suspension concentrates or herbicidal compositions according to the invention being applied to the harmful plants, parts of plants, plant seeds or the area in which the plants grow, for example the area under cultivation.

The plant crops can also have been genetically modified or have been obtained by mutation selection and are preferably tolerant to acetolactate synthase (ALS) inhibitors.

The aqueous suspension concentrates according to the invention are prepared in a manner known to the person skilled in the art, for example by mixing the individual constituents; see, in this context, Winnacker-Küchler, "Chemische Teclmologie", volume 7, C. Hauser Verlag Munich, 4th Ed. 1986, Wade van Valkenburg, "Pesticide Formulations", Marcel Dekker, N.Y., 1973; K. Martens, "Spray Drying" Handbook, 3rd Ed. 1979, G. Goodwin Ltd. London.

The abovementioned active substances are known to the skilled worker for example from "The Pesticide Manual" 14th Ed., British Crop Protection Council 2006, and the website "http://www.alanwood.net/pesticides/".

The herbicide composition of the present invention can also be used as a mixture together with or in combination with other agricultural chemicals, tank-mix adjuvants, crop oil concentrates, fertilizers and/or safeners.

The herbicidal composition of the present invention is preferably a liquid "ready-mix" formulation—that will be diluted prior to use. Dilution of the herbicidal composition of the present invention will typically result in a suspension.

The present invention further provides a method for the preparation of an herbicidal composition of the present invention comprising mixing together, simultaneously or sequentially in any order the components A) to I).

The application of the composition may vary within wide limits and depends on the nature of the soil, the method of application (pre- or post-emergence; seed dressing; application to the seed furrow etc), the crop plant, the undesirable vegetation to be controlled, the prevailing climatic conditions and other factors.

The dispersions according to the invention show significantly improved application behavior, and manifests itself in markedly reduced sieve residues or clogging of sieves or nozzles.

The application rate of the dispersions according to the invention per hectare generally varies between 0.5 and 5 liters, preferably between 1.0 and 4.0 liters.

For use, the dispersions according to the invention may be diluted in a customary manner, for example to give suspensions, for example by means of water. It may be advantageous to add, to the spray mixtures obtained, further agrochemical active substances (for example partners for tank mixers in the form of suitable formulations) and/or adjuvants and additives conventionally used for application, for example autoemulsifying oils such as vegetable oils or liquid paraffin and/or further fertilizers. The present invention therefore also relates to the herbicidal compositions prepared in this manner.

Usually, the ratio of dispersion according to the invention to water amounts to from 1:500 to 1:50. The spray mixture per ha is usually 50 to 500 liters, preferably 75 to 350 liters of water. In some cases, the concentrations may also fall short of, or exceed, the limits detailed herein. The dispersions are also suitable for aerial application. To this end, dispersions according to the invention are applied either in undiluted form or diluted with water or with organic solvents. In this context, the volume of additional carrier liquid will, as a rule, vary from 0.5 to 50 liters per hectare. The present invention therefore also relates to such herbicidal compositions based on the dispersions according to the invention.

The herbicide composition of the present invention can also be used as mixture together with or in combination with other agricultural chemicals, tank-mix adjuvants, crop oil concentrates and/or fertilizers.

The herbicidal composition of the present invention is preferably a liquid "ready-mix" formulation—that will be diluted prior to use. Dilution of the herbicidal composition of the present invention will typically result in a diluted suspension.

The locus may include both "desirable" and "undesirable" vegetation. Desirable vegetation is for example a crop which is substantially unaffected by the herbicide application. Examples of crops include for example perennial crops such as citrus fruit, grapevines, nuts, oil palm, olives, pome fruit, stone fruit and rubber, and annual arable crops, such as cereals, for example barley and wheat, cotton, oilseed rape, maize, rice, soy beans, sugar beet, sugar cane, sunflowers, ornamentals and vegetables. The compositions of the present invention are particularly suited for controlling undesirable vegetation in maize.

The term "crop" is to be understood as also including a crop which has been genetically modified and in particular one which has been rendered tolerant to herbicides or classes of herbicides (e.g. ALS-, GS-, EPSPS-, PPO- and HPPD-inhibitors).

The dispersions or herbicidal compositions according to the invention have an outstanding herbicidal activity against a broad spectrum of economically important monocotyledonous and dicotyledonous harmful plants. The activity also extends to weeds which sprout from rhizomes, root stocks or other perennial organs and which are difficult to control. In this context, the compositions may be applied for example before sowing, pre-emergence or post-emergence. Specifically, some representatives of the monocotyledonous and dicotyledonous weed flora which can be controlled by the herbicidal compositions according to the invention may be mentioned by way of example, without the mention being intended as a restriction to certain species: among the monocotyledonous weed species, good activity is effected on, for example, *Apera spica venti, Avena* spp., *Alopecurus* spp., *Brachiaria* spp., *Digitaria* spp., *Lolium* spp., *Echinochloa* spp., *Panicum* spp., *Phalaris* spp., *Poa* spp., *Setaria* spp. and *Bromus* spp. such as *Bromus catharticus, Bromus secalinus, Bromus erectus, Bromus tectorum* and *Bromus japonicus* and *Cyperus* species from among the annuals, and, among the perennial species, *Agropyron, Cynodon, Imperata* and *Sorghum* and also perennial *Cyperus* species. Among the dicotyledonous weed species, the spectrum of action extends to species such as, for example, *Abutilon* spp., *Amaranthus* spp., *Chenopodium* spp., *Chrysanthemum* spp., *Galium* spp. such as *Galium aparine, Ipomoea* spp.,

*Kochia* spp., *Lamium* spp., *Matricaria* spp., *Pharbitis* spp., *Polygonum* spp., *Sida* spp., *Sinapis* spp., *Solanum* spp., *Stellaria* spp., *Veronica* spp. and *Viola* spp., *Xanthium* spp. among the annuals and *Convolvulus, Cirsium, Rumex* and *Artemisia* among the perennial weeds.

The compositions according to the invention also effect outstanding control of harmful plants which are found under the specific culture conditions in rice, such as, for example, *Echinochloa, Sagittaria, Alisma, Eleocharis, Scirpus* and *Cyperus*.

If the herbicidal compositions according to the invention are applied to the soil surface before germination, either the emergence of the weed seedlings is prevented completely, or the weeds grow until they have reached the cotyledon stage, but then their growth stops and they eventually die completely after three to four weeks have elapsed.

When the herbicidal compositions according to the invention are applied post-emergence to the green parts of the plant, their growth also stops drastically very soon after the treatment, and the weed plants remain at the growth stage present at the time of application or die fully after a certain time has elapsed, so that, in this manner, competition by weeds, which is harmful to the crop plants, is eliminated at a very early point in time and in a sustained manner.

The herbicidal action of the herbicide combinations according to the present invention can be improved, for example, by surfactants, preferably by wetters from the group of the fatty alcohol polyglycol ethers. The fatty alcohol polyglycol ethers preferable contain 10-18 carbon atoms in the fatty alcohol radical and 2-20 ethylene oxide units in the polyglycol ether moiety. The fatty alcohol polyglycol ethers can be nonionic or ionic, for example in the form of fatty alcohol polyglycol ethers sulfates, which can be used, for example, as alkali metal salts (e.g. sodium salts or potassium salts) or ammonium salts, but also as alkaline earth metal salts such as magnesium salts, such as sodium $C_{12}/C_{14}$ fatty alcohol diglycol ether sulfate (Genapol® LRO, Clariant); see, for example, EP-A-0476555, EP-A-0048436, EP-A-0336151 or U.S. Pat. No. 4,400,196 and also Proc. EWRS Symp. "Factors Affecting Herbicidal Activity and Selectivity", 227-23 2 (1988). Nonionic fatty alcohol polyglycol ethers are, for example, ($C_{10}$-$C_{18}$)—, preferably ($C_{10}$-$C_{14}$)-fatty alkohol polyglycol ethers containing 2-20, preferably 3-15, ethylene oxide units (e.g. isotridecyl alcohol polyglycol ether), for example from the Genapol® series, such as Genapol® X-030, Genapol® X-060, Genapol® X-080 or Genapol® X-150 (all from Clariant GmbH).

The present invention furthermore embraces the combination of herbicides (I) and (II) as defined above with the wetting agents mentioned above from the group of the fatty alcohol polyglycolethers which preferably contain 10-18 carbon atoms in the fatty alcohol radical and 2-20 ethylene oxide units in the polyglycol ether moiety and which can be present in nonionic or ionic form (for example as fatty alcohol polyglycol ether sulfates). Preference is given to $C_{12}/C_{14}$ fatty alcohol diglycol ether sulfate sodium (Genapol® LRO, Clariant); and isotridecyl alcohol polyglycol ether with 3-15 ethylene oxide units, for example from the Genapol® X series, such as Genapol® X-030, Genapol® X-060, Genapol® X-080 or Genapol® X-150 (all from Clariant GmbH). It is furthermore known that fatty alcohol polyglycol ethers such as nonionic or ionic fatty alcohol polyglycol ethers (for example fatty alcohol polyglycol ether sulfates) are also suitable for use as penetrants and activity enhancers for a number of other herbicides, inter alia also for herbicides from the group of the imidazolinones (see, for example, EP-A-0502014).

Moreover, it is known that fatty alcohol polyglycol ethers such as nonionic or ionic fatty alcohol polyglycol ethers (for example fatty alcohol polyglycol ether sulfates) are also suitable as penetrants and synergists for a number of other herbicides, inter alia also herbicides from the group of the imidazolinones; (see, for example, EP-A-0502014).

The herbicidal effect of the herbicide combinations according to the present invention can also be increased using vegetable oils. The term vegetable oils is to be understood as meaning oils from oil-plant species, such as soya oil, rapeseed oil, corn oil, sunflower oil, cottonseed oil, linseed oil, coconut oil, palm oil, safflower oil or castor oil, in particular rapeseed oil, and their transesterification products, for example alkyl esters, such as rapeseed oil methyl ester or rapeseed oil ethyl ester.

The vegetable oils are preferably esters of $C_{10}$-$C_{22}$—, preferably $C_{12}$-$C_{20}$-fatty acids. The $C_{10}$-$C_{22}$-fatty acid esters are, for example, esters of unsaturated or saturated $C_{10}$-$C_{22}$-fatty acids, in particular those with an even number of carbon atoms, for example erucic acid, lauric acid, palmitic acid and, in particular, $C_{18}$-fatty acids such as stearic acid, oleic acid, linoleic acid or linolenic acid.

Preferred $C_1$-$C_{20}$-alkyl-$C_{10}$-$C_{22}$-fatty acid esters are the methyl, ethyl, propyl, butyl, 2-ethylhexyl and dodecyl esters. Preferred glycol- and glycerol-$C_{10}$-$C_{22}$-fatty acid esters are the uniform or mixed glycol esters and glycerol esters of $C_{10}$-$C_{22}$-fatty acids, in particular those fatty acids which have an even number of carbon atoms, for example erucic acid, lauric acid, palmitic acid and, in particular, Cis-fatty acids such as stearic acid, oleic acid, linolic acid or linolenic acid.

The vegetable oils can be present in the herbicidal compositions according to the present invention for example in the form of commercially available oil-containing formulation additives, in particular those based on rapeseed oil such as Hasten® (Victorian Chemical Company, Australia, hereinbelow termed Hasten, main constituent: rapeseed oil ethyl ester), Actirob® B (Novance, France, hereinbelow termed Actirob® B, main constituent: rapeseed oil methyl ester), Rako-Binol® (Bayer AG, Germany, termed Rako-Binol hereinbelow, main constituent: rapeseed oil), Renol® (Stefes, Germany, termed Renol hereinbelow, vegetable oil constituent: rapeseed oil methyl ester), or Stefes Mero® (Stefes, Germany, hereinbelow termed Mero, main constituent: rapeseed oil methyl ester).

The amount of oil additive in the formulations according to the invention is generally from 0.01 to 10%, based on the mixture to be applied.

A herbicide combination according to the present invention and a composition comprising the herbicide combination as defined in the context of the present invention are preferably applied to the harmful plants or undesired plants or parts thereof, seeds of the plants or the area under cultivation (soil of a field), preferably to the green of the harmful plants or parts thereof, or to the green parts of the undesired plants or parts thereof.

A composition comprising a herbicide combination used in the context of the present invention has the advantage of being easier to apply since the quantities of the components are already presented in the correct ratio to each other. Moreover, the adjuvants in the formulation can be matched optimally to each other.

As already described in more detail above, the present invention further relates to the use of combination of herbicides according to the present invention (preferably in one of the preferred embodiments defined herein) or a composition according to the present invention (preferably in one of the preferred embodiments defined herein) in the field of agriculture, in particular as plant growth regulators and/or for controlling harmful plants or undesired plant growth.

The abovementioned properties and advantages are useful in practical weed control in order to keep agricultural crops free from undesired competing plants, thereby safeguarding and/or increasing the yields in terms of quality and quantity. These novel compositions markedly outperform the technical standard with regards to the above-described properties.

Although the herbicidal compositions have an outstanding herbicidal activity against monocotyledonous and dicotyledonous weeds, crop plants of economically important crops, for example dicotyledonous crops such as soybean, cotton, oilseed rape, sugar beet, or Gramineae crops such as wheat, barley, rye, oats, sorghum/millet, rice or maize are only damaged to a negligible extent, or not at all. This is why the herbicidal compositions according to the invention are highly suitable for the selective control of undesired vegetation in stands of agriculturally useful plants or in stands of ornamentals.

Moreover, the herbicidal compositions according to the invention have outstanding growth-regulatory properties in crop plants. They engage in the plants' metabolism in a regulatory fashion and can therefore be employed for the targeted control of plant constituents and for facilitating harvesting such as, for example, by triggering desiccation and stunted growth. Moreover, they are also suitable for generally controlling and inhibiting undesired vegetative growth without killing the plants in the process. Inhibiting the vegetative growth plays an important role in many monocotyledonous and dicotyledonous crops since lodging can thereby be reduced or prevented completely.

Owing to their herbicidal and plant-growth-regulatory properties, the herbicidal compositions according to the invention can also be used for controlling harmful plants in crops of genetically modified plants which are known or yet to be developed. As a rule, the transgenic plants are distinguished by special advantageous properties, for example by resistances to certain pesticides, mainly certain herbicides, resistances to plant diseases or pathogens of plant diseases, such as certain insects or microorganisms such as fungi, bacteria or viruses. Other special properties relate for example to the harvested material with regards to quantity, quality, storability, composition and specific constituents. Thus, transgenic plants are known which have an increased starch content or a modified starch quality, or those which have different fatty acid composition of the harvested material.

Preferred is the use of the herbicidal compositions according to the invention in economically important transgenic crops of useful plants and ornamentals, for example Gramineae crops such as wheat, barley, rye, oats, sorghum/millet, rice and maize, or else crops of sugar beet, cotton, soybean, oilseed rape, potato, tomato, pea and other vegetables. Preferably, the compositions according to the invention can be employed as herbicides in crops of useful plants which are resistant or have been made resistant by means of genetic engineering, to the phytotoxic effects of the herbicides.

When using the herbicidal compositions according to the invention in transgenic crops, activities which are specific to the application in the respective transgenic crop can frequently be observed, in addition to the activities which can be observed in other crops, for example a modified or specifically extended weed spectrum which can be controlled, modified application rates which may be employed for application, preferably good combining ability with the herbicides to which the transgenic crop is resistant, and an influence on the growth and yield of the transgenic crop plants.

The liquid formulations from the present invention are low-foam formulations with good storage properties. In many cases they have very favorable technical properties on application. By way of example the formulations are distinguished by a low tendency to aggregate or forming a supernatant, e.g. during storage.

Accordingly, the formulations of the invention are especially suitable for use in crop protection where the formulations are applied to the plants, to parts of plants or to the area under cultivation.

In the case of herbicidal components A) and B) and C) the formulations are very suitable for controlling unwanted plant growth both on uncultivated land and in tolerant crops.

The present invention is demonstrated but not limited by the following examples.

WORKING EXAMPLES

The examples below illustrate the invention.

Technical grade thiencarbazone-methyl, tembotrione and cyprosulfamide were used to prepare the example compositions, together with self-made glyphosate potassium stock solution. The inert formulating ingredients are identified below.

The terms used in the examples hereinbelow denote:

| Name | Description |
| --- | --- |
| CYPROSULFAMIDE | N-[4-(cyclopropylcarbamoyl)phenylsulfonyl]-o-anisamide (Bayer AG) |
| TEMBOTRIONE | 2-{2-chloro-4-mesyl-3-[(2,2,2-trifluoroethoxy)methyl]benzoyl}cyclohexane-1,3-dione (Bayer AG) |
| THIENCARBAZONE-METHYL | Methyl 4-({[(3-methoxy-4-methyl-5-oxo-4,5-dihydro-1H-1,2,4-triazol-1-yl)-carbonyl]amino}sulfonyl)-5-methylthiophene-3-carboxylate (Bayer AG) |
| GLYPHOSATE-IPA TK 62 W | A stock solution containing 62 wt % N-phosphonomethylglycine as the isopropylamine salt (Monsanto) |
| GYP TK 47.3 W | A stock solution containing 47.3 wt % N-phosphonomethylglycine as the potassium salt (prepared from the literature via titration with potassium hydroxide) |
| ACTICIDE ® B 20 | Aqueous dipropylene glycol solution of approx. 20% 1,2-Benzisothiazolin-3-on as sodium salt (Thor GmbH) |
| ACTICIDE ® SPX | Microbicide based on Isothiazolones (Thor GmbH) |
| CITRIC ACID ANHYDROUS | Poly organic acid |
| GERONOL ® CF/82-CC | Glyphosate adjuvant based on Choline Chloride and designed for high load Glyphosate K-salt (Solvay) |

-continued

| Name | Description |
|---|---|
| GERONOL ® CF/AR-E | Alkyl etherphosphate amine salt (Solvay) |
| MULTITROPE ® 1214 | Alkyl polyethylene glykol ether phosphoric acid ester, acid form (CRODA) |
| SAG ® 1572 | Aqueous emulsion of Polydimethylsiloxane (Momentive) |
| SAG ® 1599 | Aqueous emulsion of Polydimethylsiloxane (Momentive) |
| HORDAPHOS ® 1306 | Alkyl polyethylene glykol ether phosphoric acid ester, acid form (Clariant) |
| SOPROPHOR ® 3 D 33 | Tristyrylphenol ethoxylate phosphate ester, acid form (Solvay) |
| ATTAGEL ® 50 | Aluminium magnesium hydro silicate >90% (BASF) |
| DISPERSOGEN ® LFH | Tristyryl phenol-polyethylene glycol-phosphoric acid ester, acid form (Clariant) |
| MULTITROPE ® 1620 | $C_8$-$C_{10}$ Alkyl polyglycoside, approx. 70% in aqueous solution (CRODA) |
| PROXEL ® GXL 20% | Aqueous dipropylene glycol solution of approx. 20% 1,2-Benzisothiazolin-3-on as sodium salt (LONZA Group AG) |
| SILCOLAPSE ® 416 | Polydimethylsiloxanes, silica and non-ionic surfactant (Elkem Silicones) |
| VAN GEL ® B | Magnesium aluminium silicate, Smectite clay (R. T. Vanderbilt Company, Inc) |
| RHODOPOL ® G | Xanthan gum, Heteropolysaccharide (Solvay) |
| GERONOL ® CF/010 | 30-40% N,N-Dimethyldecylamine N-oxide (Solvay) |
| GLYCERINE | anti-freeze and carrier |
| SYNERGEN ® GA | D-Glucitol, 1-deoxy-1-(methylamino)-, N—$C_8$-$C_{10}$ acyl derivative (Clariant) |
| 1,2-PROPYLENE GLYCOL | Antifreeze |

Methods

All tests were performed with CIPAC Methods (CIPAC=Collaborative International Pesticides Analytical Council; www.cipac.org).

Method for Testing the Storage Stability at 2W54:

Decomposition after 2W54 storage: The storage was done after CIPAC MT 46.3 at 2 weeks 54° C. 2W54=Result of the fast storage (2 weeks 54° C.) to check the long-term storage stability of a formulation. The test for determining the storage stability is carried out by storing 1-500 g samples of the formulations according to the invention at the temperatures and storage condition of 2 weeks 54° C. After this storage, the active compound analysis is carried out by HPLC methods known to the person skilled in the art. The decomposition amount of the active ingredient is given in %.

Visual Evaluation:

- direct check of physical stability (homogeneous suspension, flocculation, crystals/long needles for crystal growth, agglomeration,) of the formulation All % in the composition tables are referring to wt % eg weight/weight content.

Preparation of a Suspension According to the Present Invention:

TABLE 1

| Comparative Example CE 5: | | |
|---|---|---|
| | Component | Amount in % |
| D | CYPROSULFAMIDE | 0.42 |
| B | TEMBOTRIONE | 2.08 |
| A | THIENCARBAZONE-METHYL | 0.14 |
| C | GYP TK 47.3 W | 61.96 |
| H | ACTICIDE ® B 20 | 0.18 |
| H | ACTICIDE ® SPX | 0.08 |
| F | CITRIC ACID ANHYDROUS | 5 |
| E | GERONOL ® CF/AR-E | 10 |
| E | MULTITROPE ® 1214 | 2 |
| H | SAG ® 1572 | 0.5 |
| I | GLYCERINE | 17.64 |

Glycerine or Water-Based Formulations:

Making of the Tembotrione, Thiencarbazone-Methyl and Cyprosulfamide Mill-Base:

A suspension concentrate in glycerine is prepared which is used as a Technical concentrate (TK): Component E) and H) are initially introduced in dissolved form into component I). Then, the finely-ground components A), B) and D) are added little by little with stirring. Milling on a WAB Research mill [Dyno-mill horizontal bead mills (Willy A Bachofen AG)] is started and continued until a homogeneous suspension has formed with a particle size d90 between 6-12 □m.

Alternatively, the suspension obtained in this manner is subjected to coarse pre-grinding in a colloid mill and then ground in a glass bead mill using glass beads of a diameter of 1 mm until the mean particle size is 5 to 10 □m. During grinding, the suspension is kept at a temperature of at most 25° C. using external cooling.

Making of the Final Formulation:

The final formulation is prepared by adding slowly C) under stirring to the mill base. The rheological modifier or component G) if needed, is added post milling as a solid (Rhodopol® G) and the slurry is stirred until no lumps are seen (ca 20 min.). The final pH is then adjusted with component F).

The same process is used when component I) is water.

Water is initially charged in a stirred tank. With stirring, defoamers, dispersants, preservatives and antifreeze agents, herbicides and safeners are added, and stirring is continued for a short while. Thickeners and thixotropic agents are then added.

Alternatively, the mill-base can be milled with component C). If necessary, the rheological additive component G) is added post-milling, stirring continued for 20 min, and at last component F) is used to adjust the pH of the final formulation.

Thickeners and thixotropic agents are then added can be also added pre-milling.

The preparation procedure described relates to the recipes of examples 1 to 4 mentioned below.

The resulting suspension according to the invention is storage-stable over a prolonged period. Even upon prolonged storage at high temperatures the active substance A) and B) show only a very low degree of decomposition. The suspension according to the invention can be diluted with water to give a homogeneous suspension. It has outstanding activity against harmful plants while simultaneously being very well tolerated in crops of useful plants.

TABLE 2

Comparative Examples in glycerine, with the primary goal of finding a surfactant system which stabilizes the actives in glycerine, based on known state of art, comparative examples (CE):

| Component | CE 1 Amount in % | CE 2 Amount in % | CE 3 Amount in % |
|---|---|---|---|
| CYPROSULFAMIDE | 0.42 | 0.42 | 0.49 |
| TEMBOTRIONE | 2.08 | 2.08 | 2.44 |
| THIENCARBAZONE-METHYL | 0.14 | 0.14 | 0.16 |
| GYP TK 47.3 W | 61.96 | 61.96 | 72.53 |
| ACTICIDE ® B 20 | 0.18 | 0.18 | 0.18 |
| ACTICIDE ® SPX | 0.08 | 0.08 | 0.08 |
| CITRIC ACID ANHYDROUS | 5 | 5 | 5 |
| GERONOL ® CF/82-CC | 10 | 10 | |
| MULTITROPE ® 1214 | 2 | | |
| MULTITROPE ® 1620 | | 2 | |
| SYNERGEN ® GA | | | 15 |
| SAG ® 1599 | 0.05 | 0.05 | |
| SAG ® 1572 | 0.05 | 0.05 | 0.5 |
| GLYCERINE | 18.09 | 18.09 | 3.62 |

TABLE 3

Storage stability as decomposition of tembotrione and thiencarbazone-methyl and cyprosulfamide at 2W54, % degradation:

| Compound | Storage conditions | Comparative Example (CE) [% degradation] 1 | 2 | 3 |
|---|---|---|---|---|
| tembotrione | 2W54 | 7.24 | 1.44 | 17.76 |
| thiencarbazone-methyl | 2W54 | 2.21 | 1.62 | 15.9 |
| cyprosulfamide | 2W54 | 0 | 0 | 9.61 |
| Visual evaluation | 2W54 | ok | ok | Agglomeration/ flocculation |

The storage stability of the formulation according to the invention manifests itself for example in the form of a lesser degree of decomposition of the active substance of group A) and B) upon storage at different temperatures. To this end, a first experiment involved preparing the abovementioned formulation according to the invention in accordance with the above-described method and storing the products for two weeks at 54° C. The results in table 3 show that the formulation similar to the state of art (carrier of the suspension is glycerin, but present at <60% compared to the state of art recipe) shows a lower decomposition of the active substance of group A) and B), thus glycerine can effectively stabilize both actives at such low loading. The use of glycerine does have some negative effects by raising the viscosity of the formulation and incorporating air, which makes a scale-up difficult.

Comparative Example 1 shows that the omission of MULTITROPE® 1620 compared to Comparative Example 2 has a negative effect on the chemical stability of tembotrione component B). Thus, the alkyl polyglycoside MULTITROPE® 1620 having a stabilizing effect on tembotrione chemical stability, is identified as a key stabilizing surfactant. Thus, a surfactant system was identified where tembotrione and thiencarbazone-methyl are stable under extremely hard storage conditions.

Comparative Example 3 shows that a different surfactant chemistry does disrupt completely the system, despite SYNERGEN® GA is known from state of art to stabilize high salt content suspension concentrates.

Comparative Example 3 shows that without glycerine as carrier (water phase as carrier) and a different surfactant, decomposition of all three active ingredients has a non-acceptable level.

TABLE 4

Effect of use of glyphosate-potassium over IPA (iso-propylammonium) salt technical concentrate as comparative examples (CE):

| Component | CE 4 Amount in % | CE 5 Amount in % | CE 6 Amount in % |
|---|---|---|---|
| CYPROSULFAMIDE | 0.48 | 0.42 | 0.42 |
| TEMBOTRIONE | 2.42 | 2.08 | 2.08 |
| THIENCARBAZONE-METHYL | 0.16 | 0.14 | 0.14 |
| GLYPHOSATE-IPA TK 62 W | 45.94 | | |
| GYP TK 47.3 W | | 61.96 | 61.96 |
| ACTICIDE ® B 20 | 0.18 | 0.18 | 0.18 |
| ACTICIDE ® SPX | 0.08 | 0.08 | 0.08 |
| CITRIC ACID ANHYDROUS | 5 | 5 | 5 |
| GERONOL ® CF010 | | | 10 |
| GERONOL ® CF/AR-E | 10 | 10 | |
| MULTITROPE ® 1214 | 2 | 2 | 2 |
| SAG ® 1599 | | | 0.05 |

TABLE 4-continued

| Effect of use of glyphosate-potassium over IPA (iso-propylammonium) salt technical concentrate as comparative examples (CE): | | | |
|---|---|---|---|
| Component | CE 4 Amount in % | CE 5 Amount in % | CE 6 Amount in % |
| SAG ® 1572 | 0.5 | 0.5 | |
| GLYCERINE | 33.24 | 17.64 | 18.09 |

TABLE 5

| Storage stability as decomposition of tembotrione and thiencarbazone-methyl and cyprosulfamide at 2W54: | | | | |
|---|---|---|---|---|
| | Storage | Comparative Example (CE) [% degradation] | | |
| Compound | conditions | 4 | 5 | 6 |
| tembotrione | 2W54 | 10.24 | 14.35 | 87.6 |
| thiencarbazone-methyl | 2W54 | 82.59 | 6.85 | 35.25 |
| cyprosulfamide | 2W54 | 1.8 | 0.91 | 3.05 |

The storage stability of thiencarbazone-methyl depends completely on the counter ion used for glyphosate: as Comparative Example 4 shows, while using isopropyl ammonium almost complete decomposition at high temperatures occurs, by choosing a more neutral salt as potassium leads to a better stability of the sulfonylurea active (Comparative Example 5). The use of an aminoxide based additive (GERONOL® CF010, a typical glyphosate adjuvant, Comparative Example 6) has a massive negative impact on the stability of tembotrione.

Still it remains the problem to stabilize both herbicides in low concentration not only in glycerine, but also in water. Thus, a different surfactant system must be adopted.

TABLE 6

| Effect of surfactant system variation in glycerine and glyphosate cation as comparative examples (CE): | | | | |
|---|---|---|---|---|
| Component | CE 7 Amount in % | CE 8 Amount in % | CE 9 Amount in % | CE 10 Amount in % |
| CYPROSULFAMIDE | 0.45 | 0.45 | 0.48 | 0.48 |
| TEMBOTRIONE | 2.26 | 2.26 | 2.42 | 2.42 |
| THIENCARBAZONE-METHYL | 0.15 | 0.15 | 0.16 | 0.16 |
| GLYPHOSATE-IPA TK 62 W | 42.99 | | | |
| GYP TK 47.3 W | | 67.08 | 71.95 | 71.95 |
| ACTICIDE ® B 20 | 0.18 | 0.18 | 0.18 | 0.18 |
| ACTICIDE ® SPX | 0.08 | 0.08 | 0.08 | 0.08 |
| CITRIC ACID ANHYDROUS | 0.5 | 8 | 5 | 5 |
| GERONOL ® CF/AR-E | 10 | 10 | 10 | 10 |
| MULTITROPE ® 1214 | | | 2 | |
| HORDAPHOS ® 1306 | | | | 2 |
| SOPROPHOR ® 3 D 33 | 2 | 2 | | |
| SAG ® 1572 | 0.3 | 0.3 | 0.5 | 0.5 |
| GLYCERINE | 41.09 | 9.50 | 7.23 | 7.23 |

TABLE 7

Storage stability as decomposition of tembotrione and thiencarbazone-methyl and cyprosulfamide at 2W54:

| | Comparative Example (CE) | | | |
|---|---|---|---|---|
| Compound | 7 | 8 | 9 | 10 |
| tembotrione | 15 | 30.52 | 32.92 | 31.53 |
| thiencarbazone-methyl | 100 | 27.95 | 15.59 | 13.37 |
| cyprosulfamide | 0 | 0.46 | 4.67 | 0 |
| Visual Evaluation | ok | ok | ok | crystals |

Table 7 shows with evidence that glyphosate isopropyl ammonium is not the choice when aiming at chemically stabilizing tembotrione and especially thiencarbazone-methyl (Comparative Example 7 vs 8). Comparative Examples 5 from table 4 and Comparative Example 9 show, that the amount of glyphosate potassium plays a major role in achieving a better stabilization of the two actives, with a specific surfactant system.

Comparative Example 10 shows that two surfactants of the same E1) class (alkyl ether phosphates) are not suitable for acceptable stabilization.

Next step was to find a surfactant system that stabilized low amounts of tembotrione and thiencarbarbazone-methyl in water. The stabilizing component, the alkyl polyglycoside, is missing in these comparative examples.

TABLE 8

Surfactant system stabilizing in glycerine compared to state of art recipe in water and comparative example (CE):

| Component | CE 11 Amount in % | Example 1 Amount in % | CE 12 Amount in % |
|---|---|---|---|
| CYPROSULFAMIDE | 0.42 | 0.42 | 0.48 |
| TEMBOTRIONE | 2.08 | 2.08 | 2.4 |
| THIENCARBAZONE-METHYL | 0.14 | 0.14 | 0.16 |
| GYP TK 47.3 W | 61.96 | 61.96 | 61.96 |
| 1,2-PROPYLENE GLYCOL | | | 7 |
| ACTICIDE ® B 20 | 0.18 | 0.18 | |
| ACTICIDE ® SPX | 0.08 | 0.08 | |
| PROXEL ® GXL 20% | | | 0.1 |
| CITRIC ACID ANHYDROUS | 5 | 5 | 3 |
| GERONOL ® CF/AR-E | 5 | | |
| DISPERSOGEN ® LFH | | | 4 |
| MULTITROPE ® 1214 | 2 | 2 | |
| MULTITROPE ® 1620 | | 10 | 1 |
| SAG ® 1572 | 0.5 | 0.25 | |
| GLYCERINE | 22.64 | 17.89 | |
| ATTAGEL ® 50 | | | 0.6 |
| SILCOLAPSE ® 416 | | | 0.25 |
| VAN GEL ® B | | | 0.6 |
| DEMINERALIZED WATER | | | 18.45 |

TABLE 9

Storage stability as decomposition of tembotrione and thiencarbazone-methyl and cyprosulfamide at 2W54:

| | Storage | Example | | |
|---|---|---|---|---|
| Compound | conditions | CE 11 | 1 | CE 12 |
| tembotrione | 2W54 | 18.78 | 4.8 | |
| thiencarbazone-methyl | 2W54 | 8.59 | 6.12 | |
| cyprosulfamide | 2W54 | 2.8 | 0 | |
| Visual evaluation | 2W54 | long needles | | flocculation - no analysis possible |

Table 9 shows with Example 1 the use of MULTITROPE® 1214 and MULTITROPE® 1620 as stabilizing system in glycerin, while state of the art dispersing system using DISPERSOGEN® LFH (comparative surfactant system from U.S. Pat. No. 8,053,393B2 without glyphosate-potassium, Comparative Example 12) with glyphosate-potassium leads to full flocculation and physical instability of the formulation. The system from Example 1 was explored further and Comparative Example 12 also by using a different thickener system.

The following examples describe preparation of compositions of the present invention as well as comparative compositions (Comparative Example 13) with the surfactant pair stabilizer system [i.e. component E) as E1)+E2)].

TABLE 10

Surfactant system stabilizing in water compared to state of art recipe (comparative example) in water

| Component | CE 13 Amount in % | Example 2 Amount in % | Example 3 Amount in % | Example 4 Amount in % |
|---|---|---|---|---|
| CYPROSULFAMIDE | 0.48 | 0.48 | 0.48 | 0.48 |
| TEMBOTRIONE | 2.4 | 2.4 | 2.4 | 2.4 |
| THIENCARBAZONE-METHYL | 0.16 | 0.16 | 0.16 | 0.16 |
| GYP TK 47.3 W | 61.96 | 61.96 | 61.96 | 61.96 |
| 1,2-PROPYLENE GLYCOL | 7 | | | |
| ACTICIDE ® B 20 | 0.18 | | | |
| ACTICIDE ® SPX | 0.08 | 0.08 | 0.08 | 0.08 |
| CITRIC ACID ANHYDROUS | 3 | 3 | 2.75 | 3 |
| GLYCERINE | | 7 | 7 | 7 |
| DISPERSOGEN ® LFH | 4 | | | |
| MULTITROPE ® 1214 | | 4 | 4 | 4 |
| MULTITROPE ® 1620 | 1 | 1 | 10 | 1 |
| RHODOPOL ® G | 0.15 | 0.15 | 0.15 | 0.15 |
| SILCOLAPSE ® 416 | 0.25 | 0.25 | 0.5 | 0.25 |
| DEMINERALIZED WATER | 19.34 | 19.52 | 10.52 | 19.52 |

TABLE 11

Storage stability as decomposition of tembotrione and thiencarbazone-methyl and cyprosulfamide at 2W54:

| Compound | Example | | | |
|---|---|---|---|---|
| | CE 13 | 2 | 3 | 4 |
| tembotrione | Cannot be analyzed | 6.64 | 9.05 | 6.72 |
| thiencarbazone-methyl | Cannot be analyzed | 3.96 | 4.57 | 3.59 |
| cyprosulfamide | Cannot be analyzed | 0.2 | 0 | 0 |
| Visual evaluation | Total flocculation | Homogeneous suspension | Homogeneous suspension | Homogeneous suspension |

As can be seen from the stability results for Comparative Example 13 in Table 11 (comparative surfactant system from U.S. Pat. No. 8,053,393B2 without glyphosate-potassium), not every alkyl ether phosphate as per component E1) here exemplified with DISPERSOGEN® LFH surfactant, is able to stabilize the suspension concentrate formulation in high salt solution of glyphosate-potassium. Comparative Example 13 uses the surfactant pair from one state of art recipe that is claimed to be fertilizer compatible (in our example a water-soluble salt is added on top, glyphosate-potassium). Comparative Example 12 from table 8 and Comparative Example 13 from table 10 do use the same state of art surfactant pair but differ in the thickener systems.

In the absence of MULTITROPE® 1214 [component E1) of the present invention], after 2W54 storage conditions, the formulation is completely chemically and physically unstable (analysis not possible).

The storage stability of the formulation according to the invention manifests itself for example in the form of a lesser degree of decomposition of the active substance of group A) and B) upon storage at different temperatures. To this end, a first experiment involved preparing the abovementioned formulation according to the invention in accordance with the above-described method and storing the products for 2W54. The results in table 11 with Examples 2, 3, 4 show that the formulation according to the invention shows an acceptable decomposition of the active substance of group A) and B) and is a homogeneous suspension compared to prior art (Comparative Example 13, with DISPERSOGEN® LFH) where flocculation occurs, and no analysis is possible.

Surprisingly, Example 1 from table 8 and Example 4 being examples according the present invention, while Example 1 is in glycerine, Example 4 being in water show both a similar highly acceptable level of chemical stability. Especially Example 4 is surprising and unexpected for the person skilled in the art, in that changing from glycerine carrier, where from state of art it is known that hydrolysis-sensitive compounds are chemically stabilized since water is absent, to water, the level of chemical stability is surprisingly hold.

Chemical and physical stabilization is obtained by using MULTITROPE® 1214 instead of DISPEROGEN® LFH. Example 3 shows that a higher amount of MULTITROPE® 1620 is slightly influencing negatively the stability of the herbicides, compared to Example 4.

Example 2 and 4 do show that the results are fully reproducible (same composition), the experiment was repeated in a new batch for validation, since the results were unexpected to the person skilled in the art.

However, as shown for Examples 2 and 4, as within Comparative Example 13, replacing 4% by weight of DISPERSOGEN® LFH with MULTITROPE® 1214 as component E1) added to the 0.16% of thiencarbazone-methyl by weight of the composition surprisingly slowed the decomposition of thiencarbazone-methyl to a remarkable lower rate, such that after 2 W weeks @ 54° C. more than 96% of the thiencarbazone-methyl remained. Besides functioning as a stabilizer of the thiencarbazone-methyl, Examples 2 and 4 show that one does achieve a similar excellent level of stability for tembotrione with this suitable surfactant system according to the present invention at the level achieved with Example 1 in glycerine as a carrier for the suspended particles. In Examples 2, 3 and 4 thiencarbazone-methyl achieves degradation level below 5% which is surprising and unexpected. A clear advantage in the use of water compared to glycerine is the easiness of scale-up and milling (much less heat and pressure build up during milling of the formulation and less air incorporation and much lower viscosity of the formulation) which allows easier scale-up and industrialization.

Very unexpectedly, with a very specific surfactant system, very low amounts of thiencarbazone-methyl (<0.2%) can be stabilized in water without complete loss due to hydrolysis with concomitant stabilization of tembotrione active.

The examples in the present invention show that only a specific component E1) specifically an alkyl ether phosphate, with a specific composition and predominantly present as a mono ester, with a short alkyl chain and small EO number is working as a stabilizer for this specific system. Since other dispersants as component E1) as alkyl ether phosphates such as GERONOL® CF/AR-E (Solvay), DISPERSOGEN® LFH (Clariant) did not work, it is clear to the person skilled in the art that the stabilizing effect with MULTITROPE® 1214 is very particular and unexpected and cannot be derived from the already available prior art.

After storage for several months even at elevated temperature, the aqueous suspension concentrates according to the invention have excellent stability and do not have any tendency to flocculate or to block spray nozzles.

The dispersions according to the invention show outstanding storage stability and an outstanding herbicidal activity. The outstanding storage stability manifests itself in the low chemical degradation at elevated temperatures of component B) and especially component A) used below 1%, as it is known that sulfonylurea herbicides at concentrations below 6% are highly prone to hydrolysis in water.

I claim:

1. An aqueous dispersion comprising:

A) thiencarbozone-methyl;

B) at least one triketone HPPD-inhibiting herbicide selected from the group of tembotrione and mesotrione;

C) glyphosate-potassium salt;

D) at least one safener;

E) a surfactant combination of at least E1) an alkyl ether phosphate surfactant and at least one E2) alkyl polyglycoside surfactant; and water as a first filler (I).

2. The aqueous dispersion according to claim 1 further comprising:

F) at least one pH adjuster;

G) at least one thickener and/or thixotropic agent; and

H) at least one of a biocide and defoamer.

3. The aqueous dispersion according to claim 1, wherein the safener is cyprosulfamide.

4. The aqueous dispersion according to claim 1, wherein the triketone is tembotrione.

5. The aqueous dispersion according to claim 1, further comprising 7% to 18% glycerine as a second filler.

6. The aqueous dispersion according to claim 2, wherein components A)-I) are present in the following amounts:

A) from 0.1 to 0.5%

B) from 2 to 7.5%

C) from 55 to 65% of glyphosate-potassium salt as 47.3 TK (47.3 wt % of glyphosate acid present as potassium salt)

D) from 0.3 to 1.5%

E) from 3 to 14%

F) From 2 to 5%

G) From 0.1 to 0.2%

H) From 0.3 to 3.6%

I) At least from 10 to 20% water or 7 to 18% glycerine.

7. The aqueous dispersion according to claim 1, wherein thiencarbazone-methyl is present in 0.1 to 0.2%.

8. The aqueous dispersion according to claim 6, wherein components A)-I) are present in the following amounts:

A) from 0.1 to 0.2%

B) from 2 to 3%

C) from 59 to 62% of glyphosate-potassium salt as 47.3 TK

D) from 0.3 to 0.6%

E) from 5 to 14%

F) from 2 to 5%

G) from 0.1 to 0.2%

H) from 0.3 to 3.6%

I) at least from 10 to 20% water or 7 to 18% glycerine.

9. The aqueous dispersion according to claim 2, wherein component F) is anhydrous citric acid.

10. The aqueous dispersion according to claim 1, wherein the composition is a single liquid-phase herbicide composition.

11. The aqueous dispersion according to claim 1, wherein a weight ratio of triazolinone A):triketone B) is from 1:30 to 1:10.

12. The aqueous dispersion according to claim 1, wherein the components E) are selected from the group consisting of Poly (oxy-1,2-ethanediyl),α-hydro-ω-hydroxy-, mono-C8-C10-alkyl ethers, phosphates, alkyl polyglycosides and alkyl polyglucosides.

13. The aqueous dispersion according to claim 1, wherein a ratio E1) to E2) is 4:1.

14. The aqueous dispersion according to claim 1, wherein component E1) is an alkyl ether phosphate comprising:

1) C8-C10, C8, or C10 alkyl;

2) EO number between 4 and 5;

3) Monoester content 65-80%; and

4) Diester content <10%.

15. An aqueous herbicidal composition obtained by diluting a herbicidal composition according to claim 1 with an aqueous solution of a fertilizer.

16. The aqueous herbicidal composition according to claim 15, wherein the fertilizer is ammonium sulfate or ammonium nitrate.

17. The aqueous dispersion according to claim 1, wherein the phosphates are alkyl ether phosphates.

18. The aqueous dispersion according to claim 17, wherein the alkyl ether phosphates are non-amine salts of alkylpolyethylene glykol ether phosphoric acid ester.

19. A method of controlling weeds, the method comprising application of the aqueous dispersion according to claim 1.

* * * * *